United States Patent [19]

Nagayama et al.

[11] Patent Number: 5,770,001
[45] Date of Patent: Jun. 23, 1998

[54] AUTOMATIC ASSEMBLY AND INSPECTION SYSTEM FOR OPTICAL CONNECTOR

[75] Inventors: Akira Nagayama, Tokyo; Takashi Yoshizawa, Hidaka; Kunihiko Sasakura, Higashimurayama; Tadao Saitoh, Koganei; Sigemitu Oguchi, Tokorozawa, all of Japan

[73] Assignee: Nippon Telegraph and Telephone Corporation, Tokyo, Japan

[21] Appl. No.: 605,933

[22] Filed: Feb. 23, 1996

[30] Foreign Application Priority Data

Feb. 24, 1995 [JP] Japan .................................. 7-036994

[51] Int. Cl.⁶ .......................................................... B32B 31/00
[52] U.S. Cl. ......................... 156/350; 156/353; 156/358; 156/359; 156/362; 156/378; 156/557; 29/710; 29/711; 385/60; 385/78
[58] Field of Search .................................. 156/350, 351, 156/353, 358, 359, 362, 363, 364, 378, 556, 557; 29/702, 703, 709, 710, 711, 712; 385/134, 135, 60, 78, 85

[56] References Cited

U.S. PATENT DOCUMENTS

| | | | |
|---|---|---|---|
| 4,671,629 | 6/1987 | Doyle | 350/523 |
| 4,708,422 | 11/1987 | Arounx et al. | 350/96.15 |
| 4,916,811 | 4/1990 | Uehara et al. | 29/863 |
| 5,208,977 | 5/1993 | Ricard | 29/861 |
| 5,351,334 | 9/1994 | Chun et al. | 385/134 |
| 5,394,503 | 2/1995 | Dietz, Jr. et al. | 385/135 |

FOREIGN PATENT DOCUMENTS

| | | |
|---|---|---|
| 1028110 | 1/1989 | Japan . |
| 4-372912 | 12/1992 | Japan . |
| A-04372912 | 12/1992 | Japan . |

OTHER PUBLICATIONS

S. Nakamura et al., "Automated Assemble Technique for Optical Fiber Connector", Technical Report EMC88–11, pp. 146–152, IEICE.

T. Ueda et al., " Fiber Optic Glass Ferrule Connector", NRC Technical Report, 47(12):33–38, (1994).

T. Uchida et al., "Development of Automated Connectorizing Line for Optical Fiber Cables", Furukawa Report, 94:20–24, (1994).

"Automated Mounting of Connectors to Fibre Optic Cables", Telecom 1991 product show by a consortium LOOP belonging to RACE, (1991).

M. Tsuda et al., "Automated Connectorizing Line for Optical Cables", International Wire & Cable Symposium Proceedings, pp. 781–789, (1994).

J. Schulte, "Automated Mounting of Connectors to Fiber Optic Cables", International Wire & Cable Symposium Proceedings, pp. 303–308, (1991).

A. Nagayama et al., "Automated Assembly and Inspection System for SC Optical Connector", International Wire & cable Symposium Proceedings, pp. 63–70, (1995).

*Primary Examiner*—David A. Simmons
*Assistant Examiner*—Paul M. Rivard
*Attorney, Agent, or Firm*—Finnegan, Henderson, Farabow, Garrett & Dunner, L.L.P.

[57] ABSTRACT

An automatic assembly and inspection system for optical connectors is provided, which is highly reliable and which can produce economical and highly-effective optical cords or cables with optical connectors. The automatic assembly and inspection system for optical connectors comprises a pallet for installing an optical cord; a transfer mechanism for transferring the pallet; modules for performing various processes for assembling an optical connector with the optical cord installed on the pallet which is transferred by the transfer mechanism, said various processes including one or more of the processes such as required-length cutting, pre-processing, cleaning, insertion, curing, polishing, polished surface inspection, final assembling, optical performance evaluation, and stamping, and each of the modules having a common combining mechanism and a common communication means with respect to the transfer mechanism; and a system controller for performing supervised control for the transfer mechanism and the modules based on parameters which indicate specifications for assembly and inspection of the optical connector.

26 Claims, 33 Drawing Sheets

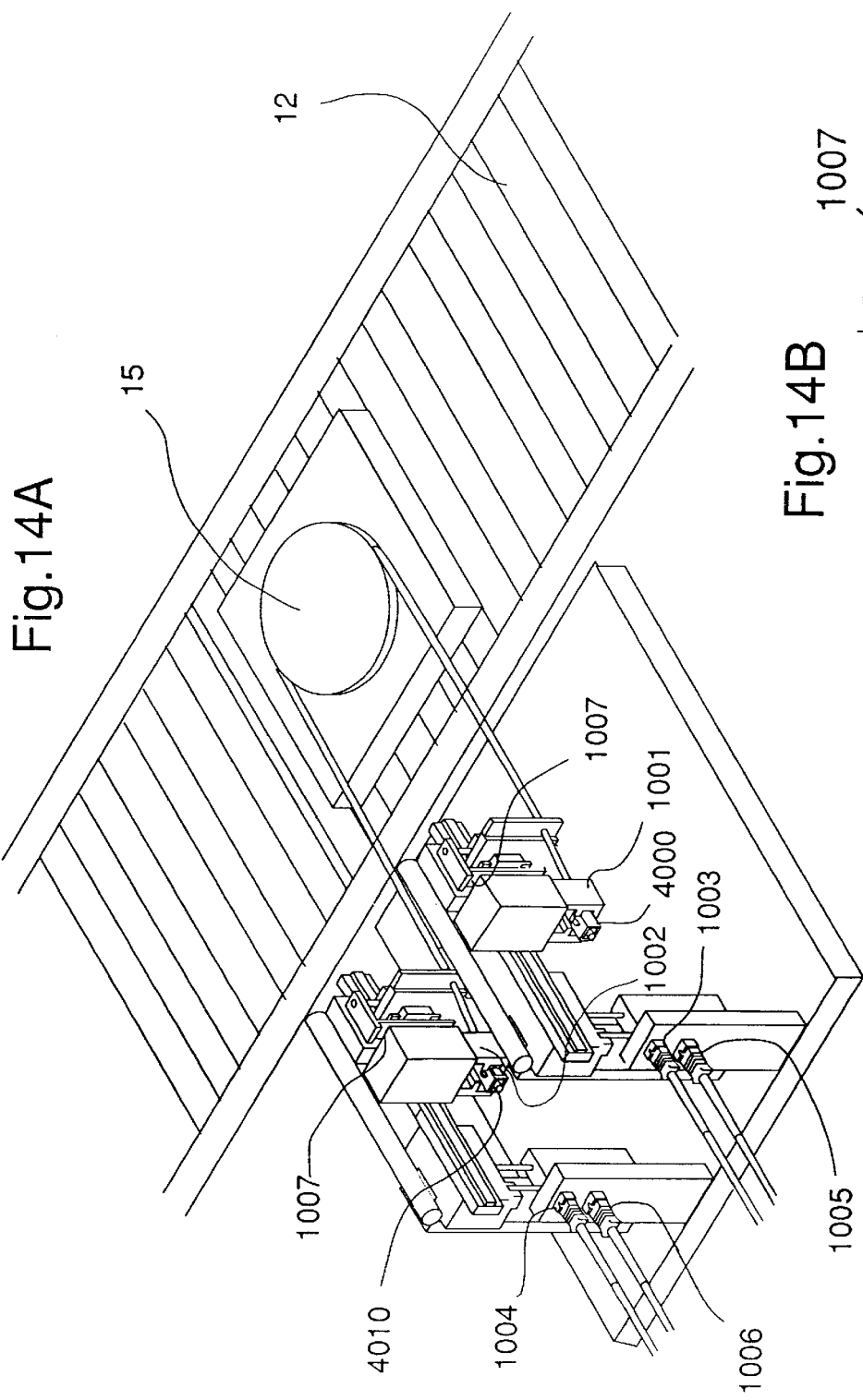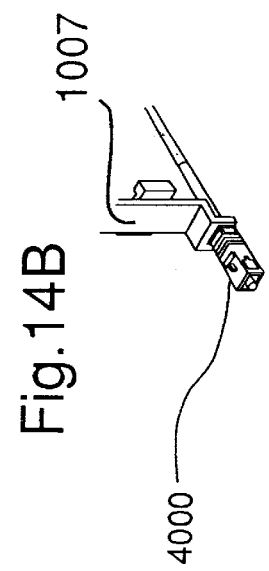

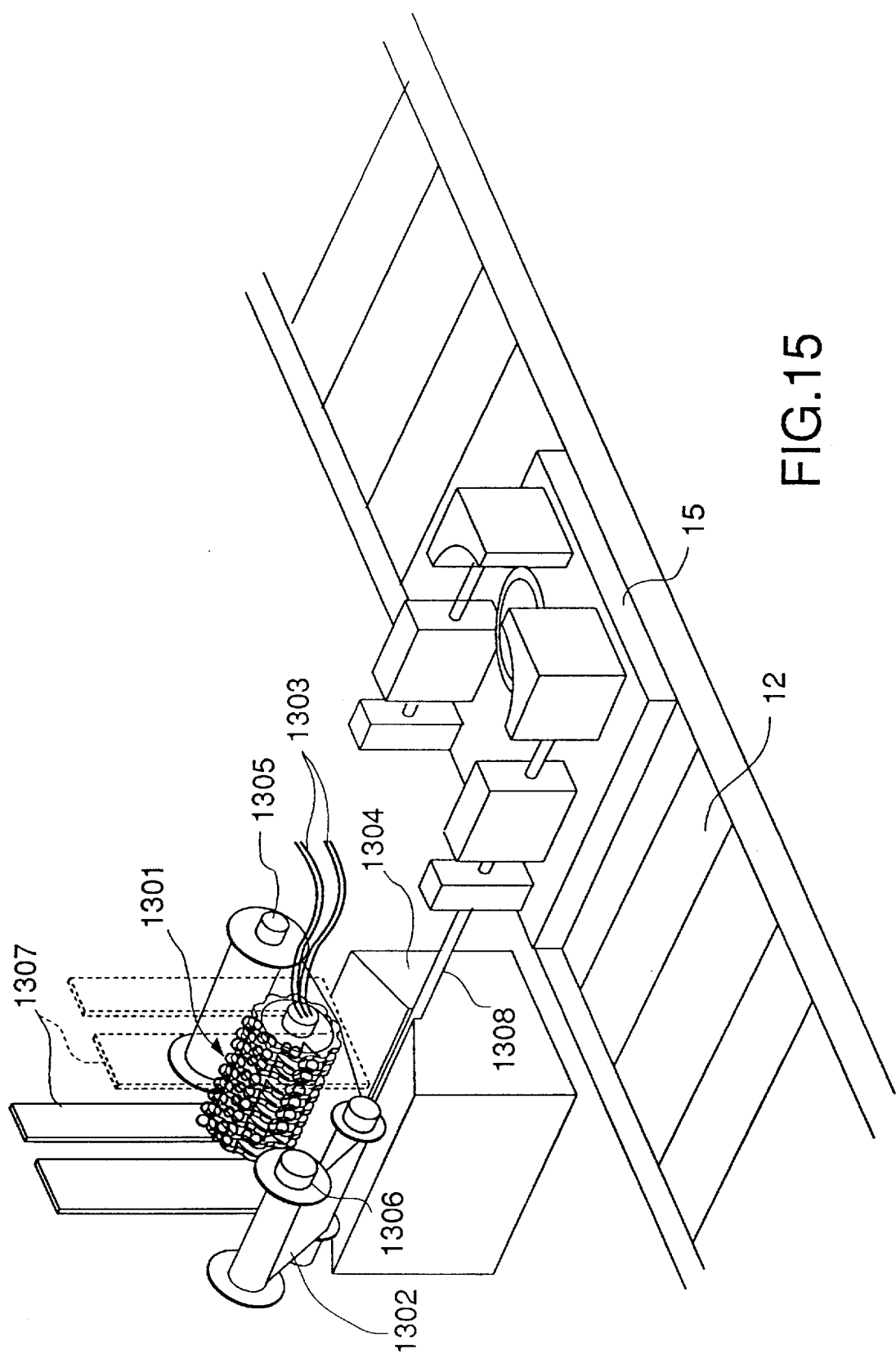

Fig.25

| PALLET STOP POSITION | TRANSFER TIME | 1 | 2 | 3 | 4 | 5 | 6 | 7 | 8 | 9 | 10 | 11 |
|---|---|---|---|---|---|---|---|---|---|---|---|---|
| | REQ.-LEN. | 1 | 1 | 1 | 1 | 1 | 1 | 1 | 1 | 1 | 1 | 1 |
| | CUT | 0 | 1 | 1 | 1 | 1 | 1 | 1 | 1 | 1 | 1 | 1 |
| | PRE-PROCESS | 0 | 0 | 1 | 1 | 1 | 1 | 1 | 1 | 1 | 1 | 1 |
| | | 0 | 0 | 0 | 1 | 1 | 1 | 1 | 1 | 1 | 1 | 1 |
| | CLEANING | 0 | 0 | 0 | 0 | 1 | 1 | 1 | 1 | 1 | 1 | 1 |
| | | 0 | 0 | 0 | 0 | 0 | 1 | 1 | 1 | 1 | 1 | 1 |
| | INSERTION | 0 | 0 | 0 | 0 | 0 | 0 | 1 | 1 | 1→0 | 1 | 1 |
| | | 0 | 0 | 0 | 0 | 0 | 0 | 0 | 1 | 1 | 0 | 1 |
| | REMOVAL | 0* | 0* | 0* | 0* | 0* | 0* | 0* | 0* | 1** | 1** | 0*** |
| | | 0 | 0 | 0 | 0 | 0 | 0 | 0 | 0 | 0 | 1 | 1 |
| | CURING | 0 | 0 | 0 | 0 | 0 | 0 | 0 | 0 | 0 | 0 | 1 |
| | | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | POLISHING | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | POL. SURFACE | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | FINAL ASSEMBL. | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | OPT. PERFORM. | 0 | 0 | 0 | 0 | 0 | 0 | 0 | 0 | 0 | 0 | 0 |
| | | 0 | 0 | 0 | 0 | 0 | 0 | 0 | 0 | 0 | 0 | 0 |
| | STAMPING | 0 | 0 | 0 | 0 | 0 | 0 | 0 | 0 | 0 | 0 | 0 |

NOTE: * "NO PALLET" AND "STATUS BIT 0"
NO REMOVAL
** "PALLET EXISTS" AND "STATUS BIT 1"
NO REMOVAL
*** "PALLET EXISTS" AND "STATUS BIT 0"
PERFORMING REMOVAL

Fig.28

| MODULE NAME | ADDRESS | MANUFACTURE PARAMETER | DATA LENGTH | REMARKS |
|---|---|---|---|---|
| REQUIRED-LENGTH CUTTING | 101 | OPTICAL CODE LENGTH | 2 | |
| | 103 | OPTICAL CODE DIAMETER | 1 | |
| | 104 | DRAWN LENGTH FROM STOP RING | 2 | |
| | 106 | NUMBER OF PRODUCTS | 2 | |
| PRE-PROCESSING | 201 | OPTICAL CODE DIAMETER | 2 | |
| | 203 | PVC CUTTING LENGTH | 2 | |
| | 205 | POLYAMIDE CUTTING LENGTH | 2 | |
| | 207 | POLYAMIDE DIAMETER | 2 | |
| | 209 | OPTICAL FIBER CUTTING LENGTH | 2 | |
| | 211 | ARAMID YARNS CUTTING LENGTH | 2 | |
| | 213 | KIND OF PRIMARY COATING | 1 | 1=SILICON, 0=UV |
| | 214 | LOOSE/TIGHT | 1 | 1=LOOSE, 0=TIGHT |
| CLEANING | 301 | POLYAMIDE DIAMETER | 2 | |
| | 303 | KIND OF PRIMARY COATING | 1 | 1=SILICON, 0=UV |
| | 304 | LOOSE/TIGHT | 1 | 1=LOOSE, 0=TIGHT |
| | 305 | OPTICAL CODE CUTTING LENGTH | 2 | |
| | 307 | NUMBER OF TIMES OF CLEANING WITH ALCOHOL | 1 | |
| | 308 | NUMBER OF TIMES OF WIPING WITH DRY CLOTH | 1 | |
| | 309 | AMOUNT OF TAPE FEED | 2 | |
| INSERTION | 401 | OPTICAL FIBER CUTTING LENGTH | 2 | |
| | 403 | OPTICAL FIBER DIAMETER | 2 | |

Fig.29

| MODULE NAME | ADD-RESS | MANUFACTURE PARAMETER | DATA LENGTH | REMARKS |
|---|---|---|---|---|
| INSERTION | 405 | POLYAMIDE CUTTING LENGTH | 2 | |
| | 407 | POLYAMIDE DIAMETER | 2 | |
| | 409 | ARAMID YARNS CUTTING LENGTH | 2 | |
| | 411 | OPTICAL CODE DIAMETER | 2 | |
| | 413 | AMOUNT OF DRIPPING ADHESIVE LIQUID | 2 | |
| | 415 | CRIMP RING INNER DIAMETER | 1 | |
| | 416 | KIND OF OPTICAL CONNECTOR | 1 | 3=SC,2=FC, 1=DC,0=ST |
| | 417 | AMOUNT OF PROTRUSION OF OPTICAL FIBER | 2 | |
| CURING | 501 | CURING TEMPERATURE | 2 | |
| | 503 | CURING TIME | 1 | |
| POLISHING | 601 | POLISHING SPEED FOR REMOVING ADHESIVE | 2 | |
| | 603 | POLISHING PRESSURE FOR REMOVING ADHESIVE | 2 | |
| | 605 | POLISHING TIME FOR REMOVING ADHESIVE | 1 | |
| | 606 | VOLUME OF WATER FOR POLISHING FOR REMOVING ADHESIVE | 1 | |
| | 607 | POLISHING AND WASHING TIME FOR REMOVING ADHESIVE | 1 | |
| | 608 | ROUGH-POLISHING SPEED | 2 | |
| | 610 | ROUGH-POLISHING PRESSURE | 2 | |
| | 611 | ROUGH-POLISHING TIME | 1 | |
| | 612 | VOLUME OF WATER FOR ROUGH-POLISHING | 1 | |
| | 613 | WASHING TIME OF ROUGH-POLISHING | 1 | |
| | 614 | PRECISE-POLISHING SPEED | 2 | |

Fig.30

| MODULE NAME | ADDRESS | MANUFACTURE PARAMETER | DATA LENGTH | REMARKS |
|---|---|---|---|---|
| POLISHING | 616 | PRECISE-POLISHING PRESSURE | 2 | |
| | 618 | PRECISE-POLISHING TIME | 1 | |
| | 619 | VOLUME OF WATER FOR PRECISE-POLISHING | 1 | |
| | 620 | CLEANING TIME OF PRECISE-POLISHING | 1 | |
| POLISHED SURFACE INSPECTION | 621 | EXCHANGE CYCLE OF POLISHER | 1 | |
| | 701 | RADIUS OF CURVATURE, UPPER LIMIT | 1 | |
| | 702 | RADIUS OF CURVATURE, LOWER LIMIT | 1 | |
| | 703 | VERTEX ECCENTRICITY UPPER LIMIT | 1 | |
| | 704 | VERTEX ECCENTRICITY LOWER LIMIT | 1 | |
| | 705 | ECCENTRICITY UPPER LIMIT | 1 | |
| | 706 | ECCENTRICITY LOWER LIMIT | 1 | |
| | 707 | FIBER WITHDRAWAL/PROTRUSION, UPPER LIMIT | 1 | |
| | 708 | FIBER WITHDRAWAL/PROTRUSION, LOWER LIMIT | 1 | |
| | 709 | LOT NUMBER | 7 | |
| | (716) | (SCRATCH LENGTH UPPER LIMIT) | 1 | |
| | (717) | (SCRATCH LENGTH LOWER LIMIT) | 1 | |
| | (718) | (SCRATCH DEPTH UPPER LIMIT) | 1 | |
| | (719) | (SCRATCH DEPTH LOWER LIMIT) | 1 | |
| FINAL ASSEMBLING | 801 | KIND OF OPTICAL CONNECTOR | 1 | 3=SC,2=FC, 1=DC,0=ST |
| OPTICAL PERFORMANCE EVALUATION | 901 | INSERTION LOSS UPPER LIMIT | 2 | |
| | 903 | INSERTION LOSS LOWER LIMIT | 2 | |

NOTE: "()" INDICATES A RESERVED PARAMETER

Fig.31

| MODULE NAME | ADDRESS | MANUFACTURE PARAMETER | DATA LENGTH | REMARKS |
|---|---|---|---|---|
| OPTICAL PERFORMANCE EVALUATION | 905 | RETURN LOSS UPPER LIMIT | 2 | |
| | 907 | RETURN LOSS LOWER LIMIT | 2 | |
| | 908 | KIND OF OPTICAL CONNECTOR | 1 | 3=SC,2=FC, 1=DC,0=ST |
| | 909 | LOT NUMBER | 7 | |
| STAMPING | 1001 | LOT NUMBER | 7 | |
| TRANSFER MECHANISM | 1101 | STOP TIME UPPER LIMIT | 1 | USED FOR DETECTION OF ANOMALOUS STATE OF SYSTEM |
| | 1102 | STOP TIME LOWER LIMIT | 1 | |
| | 1103 | TRANSFER SPEED UPPER LIMIT | 1 | |
| | 1104 | TRANSFER SPEED LOWER LIMIT | 1 | |

Fig.32

| MODULE NAME | ADDRESS | MEASURING PARAMETER | DATA LENGTH | REMARKS |
|---|---|---|---|---|
| POLISHED SURFACE INSPECTION | 721 | RADIUS OF CURVATURE | 2 | |
| | 723 | VERTEX ECCENTRICITY | 2 | |
| | 725 | ECCENTRICITY | 2 | |
| | 727 | FIBER WITHDRAWAL OR PROTRUSION | 2 | |
| | (729) | (SCRATCH LENGTH) | 2 | |
| | (731) | (SCRATCH DEPTH) | 2 | |
| | 733 | FILE NUMBER OF FLAW IMAGE DATA | 2 | |
| FINAL ASSEMBLING | 811 | ECCENTRICITY | 2 | |
| OPTICAL PERFORMANCE EVALUATION | 911 | INSERTION LOSS | 2 | |
| | 913 | RETURN LOSS | 2 | |

Fig.34

| CODE | COMMAND NAME |
|---|---|
| 01 | WRITE TABLE |
| 02 | READ TABLE |
| 03 | RESET |

Fig.33

| PIN NO. | SIGNAL NAME | PIN NO. | SIGNAL NAME |
|---|---|---|---|
| 1 | REQUIRED-LENGTH CUTTING COMPLETION | 16 | REQUIRED-LENGTH CUTTING POSSIBLE |
| 2 | PRE-PROCESSING COMPLETION | 17 | PRE-PROCESSING POSSIBLE |
| 3 | CLEANING COMPLETION | 18 | CLEANING POSSIBLE |
| 4 | INSERTION COMPLETION | 19 | INSERTION POSSIBLE |
| 5 | CURING COMPLETION | 20 | CURING POSSIBLE |
| 6 | POLISHING COMPLETION | 21 | POLISHING POSSIBLE |
| 7 | POLISHED SURFACE INSPECTION COMPLETION | 22 | POLISHED SURFACE INSPECTION POSSIBLE |
| 8 | FINAL ASSEMBLING COMPLETION | 23 | FINAL ASSEMBLING POSSIBLE |
| 9 | OPTICAL PERFORMANCE EVALUATION COMPLETION | 24 | OPTICAL PERFORMANCE EVALUATION POSSIBLE |
| 10 | STAMPING COMPLETION | 25 | STAMPING POSSIBLE |
| 11 | REMOVAL COMPLETION | 26 | REMOVAL POSSIBLE |
| 12 | ELEVATING COMPLETION | 27 | ELEVATING POSSIBLE |
| 13 | (RESERVED) | 28 | TRANSFER COMPLETION |
| 14 | (RESERVED) | 29 | DISPLAY START |
| 15 | (RESERVED) | 30 | (RESERVED) |

AUTOMATIC ASSEMBLY AND INSPECTION SYSTEM FOR OPTICAL CONNECTOR

BACKGROUND OF THE INVENTION

1. Field of the Invention

The present invention relates to an automatic assembly and inspection system for assembling optical connector(s) with an optical cord, or optical cords contained in an optical cable.

2. Description of the Related Art

In order to realize an information-oriented society which has appeared in recent multi-media concepts or information-highway concepts in the United States, the information-carrying infrastructure will have to be converted from an electrical system to the optical system so as to deal with dramatically increasing information amounts. In order to realize optical channels of communication, it is necessary to achieve high performance and high economic efficiency of optical connectors for connecting optical cords, to say nothing of improving various electrically-operated communication devices so as to be optically-operated.

When connecting an optical connector to an optical cord, the following processes are performed. FIG. 27 schematically illustrates the procedure.

(1) Required-length cutting process (see SP1): The optical cord is cut to a required length, and boot 2001, crimp ring 2002, stop ring 2003, and spring 2004 are inserted from both sides of the optical cord.

(2) Pre-processing process (see SP2): PVC Sheath 2005, aramid yarns 2006, polyamide 2007, and optical fiber 2008 are cut to predetermined lengths and waste portions are peeled off.

(3) Cleaning process: Primary coating attached to the optical fiber is removed.

(4) Insertion process (see SP4): The optical fiber is inserted into ferrule 2009 into which adhesive has been injected.

(5) Curing process: The adhesive is thermally cured in a thermostatic oven, etc.

(6) Polishing process (see SP6): The end face of the ferrule is polished to be a convex hemispherical surface.

(7) Polished surface inspection process: The contour of the ferrule end is measured to be compared with a tolerance value, and substandard products are excluded.

(8) Final assembling process: A plug frame, a coupling, and the boot, etc., are applied to cover the ferrule.

(9) Optical performance evaluation process: The optical characteristics (insertion loss, return loss) after the assembly are measured, and substandard products are excluded.

(10) Visual inspection and packing process: The appearance of acceptable products (which passed each inspection) is inspected, and if no abnormal part is detected, the products are packed and shipped.

Accordingly, for connecting an optical connector to an optical cord, it is necessary to skillfully combine the following various techniques of: handling a flexible optical cable/cord; precisely inserting an optical fiber into a ferrule with a clearance of 1 μm or less; precisely polishing the end face of an optical connector to a surface roughness of several tens of angstroms; optically measuring an infinitesimally small amount of reflection as −50 dB; and mechanically and precisely holding flexible and various-shaped parts whose end shapes are changed before and after each processing.

Therefore, regarding the present assembly of optical connectors, manual assembly, in which the above processes (1)–(10) are performed manually, is the most common, resulting in the present situation of limited production of less than a million ends per year in Japan. In the case of such limited production, manual assembly is economically feasible. However, since nearly two-thirds of the total manufacturing cost is the cost of assembly, and since skilled workers are required for assembling highly-effective optical connectors, radical improvements in the production system, that is, realization of an automatic assembly and inspection system for optical connectors, is necessary for coping with the future, which will be dominated by optical systems.

Under these circumstances, a partially automated technique for assembling processes has been reported (Reference: S. Nakamura, K. Nishimura, and R. Nagase, "Automated Assemble Technique for Optical Fiber Connector", Technical Report EMC88-11, pp. 146–152, IEICE). In this first reference, experimental examination of the automation of the above processes (2)–(4) is explained. In the examination, FC connectors were used. On the other hand, pamphlets for a system for automating the processes (2)–(4) were distributed at the TELECOM '91 product show held in October, 1991, by a consortium LOOP belonging to RACE (Research and development in Advanced Communication technologies in Europe). Similarly, another system for automating the processes (2)–(4) has been disclosed in Japanese Patent Application, First Publication, Laid-Open No. Hei 4-372912, while results of an examination for realizing a similar system have been reported in a reference (T. Ueda, T. Tanabe, K. Komatsu, et al., "Fiber Optic Glass Ferrule Connector", NEC Technical Report, Vol. 47, No. 12, pp. 33–38, 1994).

Next, the third reference for automating the processes (2)–(7) (except process (6)) can be found (Reference: T. Uchida, M. Tsuda, K. Suzuki, et al., "Development of Automated Connectorizing Line for Optical Fiber Cables", Furukawa report, Vol. 94, pp. 20–24, June, 1994). This reference reports a system in which the above manual processes, from fixing a SC ferrule with adhesive to an optical cord of required length, which has been attached with a boot, a sheath-crimp ring, a stop ring, a spring, a crimp ring, etc., manually, to polishing the end of the ferrule, and assembling the housing, are automated (here, the polished surface inspection process is excluded).

However, the above-explained conventional techniques have the following problems.

1. The concept for systematization is weak. That is, the concept for system integration, which is necessary for realizing full automation, including a technique for disposing of substandard products, a method of combining each processing device with the transfer line, a method of sending manufacture parameters (i.e., specifications) to each processing device, a method of handling data of each optical connector measured by various devices, and a method of synchronizing the operations between each device and the transfer line, is weak.

2. The conventional system configuration has no concept for step-wise automation, such as from manual-only to full-automated assembly, that is, there is no concept for selective and additional usage of necessary devices; thus, purchasing the entire system is the only way to conduct assembly. In this case, the initial set-up cost of the automated system is very high.

3. Due to the lack of a design concept in one manufacturing system when assembling various kinds of optical connectors with optical cords, or optical cables in each of which plural optical cords are bundled, a different assembly system is necessary for a different kind of optical connector, and assembling of optical connectors with an optical cable is impossible.

4. No consideration is given to discriminating between acceptable and substandard products, both of which are produced in manual-production. In this case, there is a possibility that acceptable and substandard products are mixed up. In the embodiment disclosed in the aforementioned Japanese Patent Application Hei 4-372912, production data or inspection data stored in a memory device after the fifth process of curing may be ineffective.

5. Various conventional parts for the optical connector were developed in consideration of manual assembly; thus, the number of parts is large. Therefore, there are problems in that (i) the number of modules for performing various processes necessary for automatic assembly becomes large; (ii) a complicated and expensive module for handling a spring (which is relatively difficult to handle automatically) is required; and (iii) holders of complicated structures for a boot, a sheath-crimp ring, a stop ring, a spring, a crimp ring, and the like which are provided with a flexible optical cord, and automatically handled by a parts-grip hand must be provided in a transfer mechanism.

6. Even in the most automated embodiment disclosed in the third reference, the inspection processes which determine the quality of products and which require highly-developed technology are dependent on manual work. In this case, there occur problems in that (i) transportation of products between the production line and the inspection section is necessary; thus, it is difficult to shorten the inspection time; (ii) the inspection processes which require high-level technology and skilled labor incur high labor costs, and it is difficult to reduce these cost; and (iii) the data obtained by manual inspections must be managed manually, and thus it is difficult to determine one-to-one correspondence between the products and the inspection data and to realize highly reliable quality control. In this case, production cannot meet the demands for cost reduction and improvement of reliability, which will arise in an era of mass consumption of optical connectors.

7. In the process of thermal-curing the adhesive in the embodiment disclosed in the aforementioned Japanese Patent Application Hei 4-372912 (corresponding to the above process (5)), a technique of automatically transporting an optical connector with un-cured adhesive to a heating device has not yet been developed; thus, the optical connector with un-cured adhesive is manually taken off the automation line and is set to the heating device. It is well known in this trade that the optical fiber inserted into an ferrule with adhesive in the curing process (corresponding to the above process (5)) must be thermally cured with the least possible disturbance force so as to avoid creating a minute scratch on the surface of the optical fiber, caused by the movement of the fiber in the ferrule. That is, in the conventional method, according to the manual operation, disturbance forces acted between the ferrule and the optical fiber; thus, scratches were generated in the curing process and the reliability was remarkably lowered.

Accordingly, the conventional automation techniques have covered only ¼~½ or fewer of all the processes, and have been inferior with respect to system integration. Therefore, it may be concluded that the conventional techniques have not yet greatly contributed to the cost reduction, the improvement of efficiency, and the reliability of the assembly and inspection of optical connectors.

SUMMARY OF THE INVENTION

In consideration of the above problems, the present invention enables the above-mentioned optical connector assembly and inspection processes (1)~(10) to be automated, and the purpose of the present invention is to provide an automated optical connector assembly and inspection system which can produce economical and highly-effective optical cords or cables with optical connectors.

Therefore, the present invention provides an automatic assembly and inspection system for optical connectors, comprising: a pallet for installing an optical cord; a transfer mechanism for transferring the pallet; modules for performing various processes for assembling an optical connector with the optical cord installed on the pallet which is transferred by the transfer mechanism, said various processes including one or more of the processes such as required-length cutting, pre-processing, cleaning, insertion, curing, polishing, polished surface inspection, final assembling, optical performance evaluation, and stamping, and each of the modules having a common combining mechanism and a common communication means with respect to the transfer mechanism; and a system controller for performing supervised control for the transfer mechanism and the modules based on parameters which indicate specifications for assembly and inspection of the optical connector.

According to this invention, it is possible to combine an automation machine for automating a process relating to the assembly and inspection of the optical connector with the transfer mechanism as a module. The system controller performs supervised control of the system with indicating manufacturing conditions to each controlled section according to the parameters which indicate specifications for assembly and inspection of the optical connector. Therefore, a partially automated system with respect to a part of manual assembling processes, that is, a partially automated system including automated modules corresponding to processes which are desired to be automated can be easily realized, and the initially installation cost of the system can be reduced. In addition, according to increase of the production (that is, increase of demand for optical connectors), modules corresponding to un-automated processes can be additionally purchased and disposed; thus, fully automation of the assembling and inspecting processes can be finally realized by using the existing partially automated system profitably. In this case, any inspection process, the automation of which has been especially difficult, can be automated, whereby it is unnecessary to leave such a inspection process to human hands.

In order to correspond to the common combining mechanism and communication means of each module, the transfer mechanism may be designed to have an installation part for fixing each module to any position on the transfer path and a connecting means which makes it possible to transmit and receive signals to and from the fixed module by using the communication means of the module so as to make communication between the system controller, the transfer mechanism, and the fixed module possible. To say more concretely, it is possible to dispose parts for fixing each module or communication connectors prepared for the multi-laid connection at regular intervals on a side face of the transfer path of the transfer mechanism.

On the other hand, by providing an area for keeping a slacking and extra part of the optical cord on the pallet, it is possible to establish a mechanical interface between the optical cord and the modules, which is not influenced by the length of the optical cord. In addition, a multifunctional pallet can be realize by providing, similarly on the pallet, a heating means for curing adhesive coated on the optical cord, or a grip mechanism for precisely gripping a part of the optical connector, the shape of the part to be gripped being different according to each relevant process.

If a pre-assembled ferrule as a part of the optical connector, in which a ferrule, a spring, and a stop ring are previously combined by using a locating member, is used, kinds of necessary modules can be reduced; thus, an area necessary for installing the system and the system cost can be reduced, and parts-fixing mechanisms on the pallet may be simplified.

Furthermore, if one or more of the modules, whose processes relate to the ferrule, have a grip mechanism for grasping a ferrule by using a V-groove-shaped opening and closing mechanism, the present system can be applied to the assembly and inspection for various optical connectors of SC, FC, DS, and ST types, all of which correspond to the same diameter of the ferrule, where DS is used mainly in Japan.

On the other hand, by adopting a pallet which can install plural optical cords, and additionally an optical cable drum on which an optical cable is wound and an accompaniment mechanism with respect to the transfer mechanism, automatic assembling of optical connectors, not only to an independent optical cord but also to an optical cable, can be performed.

In addition, if a stamping module for printing a lot number on the optical cord with which the optical connectors have been assembled is provided, and the system controller has a storage unit for storing inspection data obtained by any inspection or evaluation modules with lot-number data of the optical cord, a one-to-one visual correspondence between the optical cord and the inspection data may be easily obtained, whereby mixing of defective and non-defective products can be avoided.

On the other hand, by making transmitting and receiving of data between the system controller, the transfer mechanism, and each module possible via a serial communication line, it is possible to transmit and receive a large amount of data such as various manufacture or measuring parameters. In addition, by providing general input and output units for each of the transfer mechanism and the modules so as to connect them, it is possible to certainly transmit and receive data which require high speed transmission. Furthermore, a remote terminal or a LAN may be introduced into the system, whereby highly-developed system integration can be established.

Also, if a curing process is automated, it is possible to avoid generation of scratches on the surface of the optical fiber in the curing process; thus, reliability of the optical connector can be improved.

As described above, according to the present invention, an automatic assembly and inspection system for optical connectors, which has high flexibility with respect to system construction and high reliability, can be easily realized.

BRIEF DESCRIPTION OF THE DRAWINGS

FIG. 14A is a perspective view of an example of the optical performance inspection module according to the present invention, and FIG. 14B is a perspective view for showing the structure of insertion plate 1007.

FIG. 15 is a perspective view of an example of the stamping module according to the present invention.

FIG. 25 shows an example of the module operation status table according to the present invention.

FIG. 28 is for the explanation of a part of an example set of the manufacture parameters according to the present invention.

FIG. 29 is also for the explanation of a part of the example set of the manufacture parameters according to the present invention.

FIG. 30 is also for the explanation of a part of the example set of the manufacture parameters according to the present invention.

FIG. 31 is also for the explanation of a part of the example set of the manufacture parameters according to the present invention.

FIG. 32 is for the explanation of an example set of the measuring parameters according to the present invention.

FIG. 33 is for the explanation of an example of the pin connections of the connector for the second communication lines according to the present invention.

FIG. 34 is for the explanation of an example set of the command codes according to the present invention.

DESCRIPTION OF THE PREFERRED EMBODIMENTS

Hereinafter, embodiments according to the present invention will be explained with reference to the figures.

§1. First Embodiment

Figure 1:
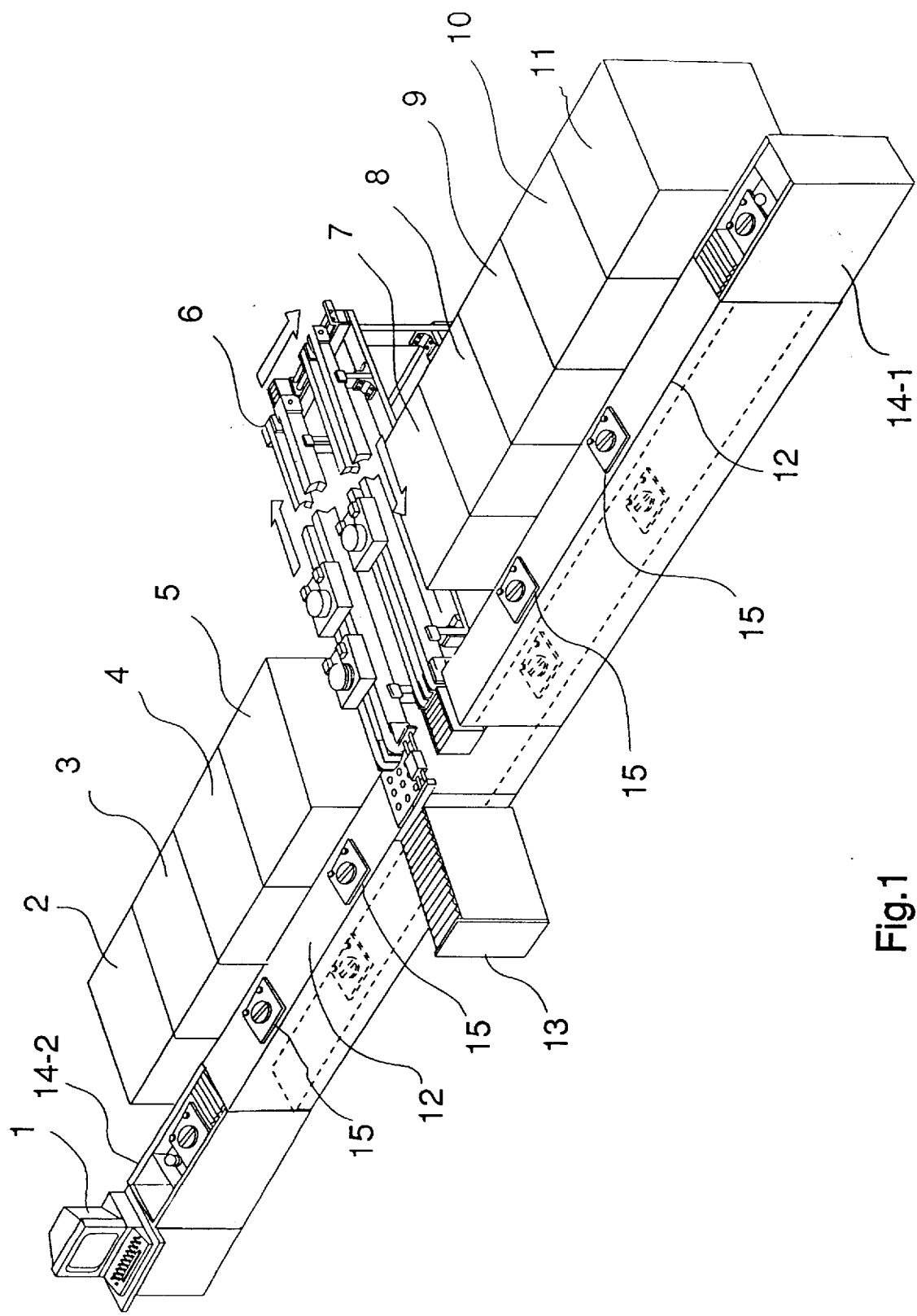
FIG. 1 is a perspective view of the assembly and inspection system for optical connectors, according to the first embodiment of the present invention.

FIG. 1 shows an arrangement of the automatic assembly and inspection system for optical connectors according to the first embodiment. In FIG. 1, reference numeral 1 indicates a system controller, reference numeral 2 indicates a required-length cutting module, reference numeral 3 indicates a pre-processing module, reference numeral 4 indicates a cleaning module, reference numeral 5 indicates an insertion module, reference numeral 6 indicates a curing module, reference numeral 7 indicates a polishing module, reference numeral 8 indicates a polished surface inspection module, reference numeral 9 indicates a final assembling module, reference numeral 10 indicates an optical performance evaluation module, reference numeral 11 indicates a stamping module, reference numeral 12 indicates a transfer mechanism, reference numeral 13 indicates a removal module, reference numerals 14 (14-1 and 14-2 in the figure) indicate elevating modules, and reference numerals 15 indicate pallets.

In FIG. 1, the modules for performing each process necessary for automatic assembly and inspection for the optical connector are disposed at a side face of the transfer mechanism from left to right.

§1-1. Summary explanation of each part of the first embodiment

The summary explanation of each part of the system consisting of the system controller, each module, and the transfer mechanism will be explained briefly below.

1. System control:

Setting of manufacture parameters, and communication and control with each module controller.

2. Required-length cutting:

Mounting of the optical cord, boot, and crimp ring, cut to required-lengths, to the pallet.

3. Pre-processing:

Cutting of the PVC Sheath of the optical cord, the aramid yarns, polyamide, and optical fiber into a predetermined length and peeling.

4. Cleaning:

Removal of primary coating.

5. Insertion:

Insertion of the optical fiber into a pre-assembled ferrule by a predetermined length. In the ferrule, adhesive has already been injected, and caulking and fixing the aramid yarns of the optical cord to a stop ring by using a crimp ring.

6. Curing:

Heating and curing the adhesive in the pre-assembled ferrule.

7. Polishing:

Grinding, rough polishing, and precise polishing of the end of pre-assembled ferrule.

8. Polished surface inspection:

Inspection of the contour of the polished surface and storage of quantitative polished-surface data such as vertex eccentricity, fiber withdrawal or protrusion, and curvature.

9. Final assembling:

Insertion of a plug frame to the pre-assembled ferrule, application of adhesive to the back end face of the crimp ring, and insertion of a boot and a coupling, in order.

10. Optical performance evaluation:

Measurement of amounts of return loss and insertion loss, and storage of the measured data.

11. Stamping:

Printing of visible data on the optical cord

12. Transferring:

Transfer of pallets by a given pitch so as to locate the head of each optical cord at a determined position in front of each module.

13. Removal:

Selection of any pallets holding defectively-assembled optical cords and storing of the selected pallets.

14. Elevating:

(Elevating modules are provided at the top and the end of the transfer module.) Lifting and lowering of the pallet.

That is, cyclically-transferred pallet 15, on which an optical cord cut by required-length cutting module 2 is installed, is positioned in front of each module by transfer mechanism 12. At each module, an optical cord grip hand pulls the optical cord into the module, and a specific process is performed at the head of the optical cord. The optical cord is then returned to the pallet again by the optical cord grip hand. Here, the optical cord with the PVC Sheath, polyamide, aramid yarns, and optical fiber which were cut to the required length and waste parts of which were peeled is then processed in each module, and a serial lot number is automatically printed on the cord in the last stamping module. The optical cord is then taken off from the pallet for visual inspection, and the pallet without an optical cord is moved to the lower path of the transfer mechanism by elevating module 14-1, and transferred to the start point of the transfer mechanism by a return belt-conveyor provided on the lower path of the transfer mechanism. In order to use the pallet repeatedly, the elevating module 14-2 raises and positions the pallet transferred by the return belt-conveyor in front of the required-length cutting module 2 so as to install a unprocessed optical cord again.

§1-2. Summary of the common functions of the modules of the first embodiment

Prior to the detailed explanation, the coordinate system used in this embodiment will be defined below.

X axis: direction of transferring the pallet

Y axis: direction of gravity (i.e., vertical direction)

Z axis: direction of pulling the optical cord into each module

Next, for obtaining desirable effects by constructing an automatic assembly and inspection system for optical connectors, the following functions are set forth as premises for the modules used in this embodiment so as to systematically combine each module, in addition to each specified function shown in §1-1.

(1) For realizing assembly of various kinds of optical connectors, a rewritable manufacture parameter table with access addresses is provided so that the system controller 1 can manage the manufacture parameters, and manufacturing conditions can be independently changed according to parameters defined in the manufacture parameter table.

(2) A readable inspection data table with access addresses is provided so that the system controller can read various inspection data obtained in the plural modules, and each inspection data can be written into the inspection data table in a given format.

(3) A readable problem information data table with access addresses is provided so that the system controller can read various problem information generated at various modules and perform suitable trouble-shooting control, and each problem information data can be written into the problem information data table in a given format.

(4) Each processing operation can start when an operation start signal from the transfer mechanism is received and the setting of parts to be processed at each determined position is detected, and a processing normal end signal can be sent to the transfer mechanism when the necessary process has normally ended.

(5) When the optical cord grip hand grasps an optical cord, an optical cord in-module signal is generated in the transfer mechanism, and when the determined process has ended, and the optical cord grip hand returns the optical cord to the pallet and turns back to its home position in order to make the transfer of pallets possible again, the optical cord in-module signal generated in the transfer mechanism is cut off.

The following functions (6)–(8) are necessary only for the transfer mechanism.

(6) Starting the transfer operation of the pallet when receiving the processing normal end signals from all the modules, and at the same time, sending a pallet on-transfer signal to each module.

(7) Generating and sending a system-anomaly signal to a device which notifies an operator of a system error if the processing normal end signals are not received from all the modules within a predetermined time.

(8) Generating and sending a system-anomaly signal to the system controller if the processing normal end signals are not received from all the modules within a predetermined time.

§1-3. Configuration of the pallet of the first embodiment

Figure 19:
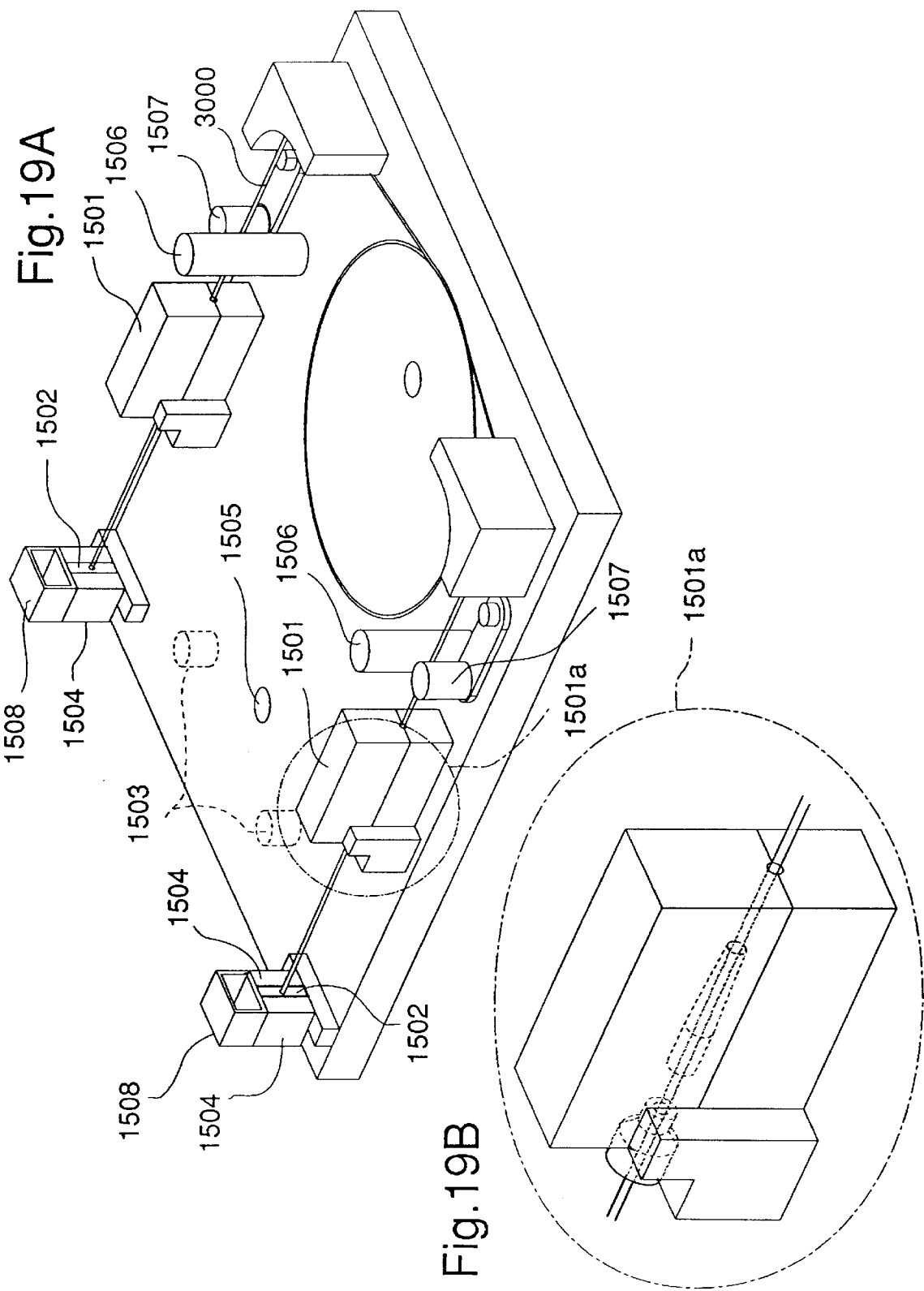
FIG. 19A is a perspective view of an example of the pallet according to the present invention.
FIG. 19B is a partially enlarged view of FIG. 19A.

FIG. 19A shows an embodiment of the pallet transferred by transfer mechanism 12. This pallet is designed with a concept of assembling optical connectors at both ends of an optical cord, and reference numerals 1501 indicate parts-holders, reference numerals 1502 indicate curing devices, reference numeral 1503 indicates power-receiving parts, reference numerals 1504 indicate heaters, reference numeral 1505 indicates an insertion hole for feed pin, reference numerals 1506 indicate idler pulleys, reference numerals 1507 indicate pinch rollers, and reference numerals 1508 indicate adapters.

The gap between idler pulley 1506 and pinch roller 1507 is made to be a little smaller than the outer diameter of an optical cord so that optical cord 3000 without parts is held by frictional force between the parts-holder and the optical cord. The inside of parts-holder 1501 which has two parts which are the upper and lower sides from the height of the passing line of the optical cord is made to be able to contain a crimp ring and a boot, as shown in an enlarged view of FIG. 19B; thus, the crimp ring and the boot are transferred to a relevant module while being contained by the parts-holder.

The curing device 1502 has a ferrule-holding hole therein, characterized by a taper shape in which the entrance part has an inner diameter slightly larger than the outer diameter of the ferrule, and the inner diameter gradually decreases toward the inside of the hole; thus, an optical cord with parts can be held by frictional force between the curing device and the ferrule. Additionally, this metallic curing device has a "sandwich" structure having heaters 1504 on both sides and the heaters are directly connected with power-receiving part 1503 attached on the bottom surface of the pallet; therefore, the heaters can be heated when the pallet is transferred on an electric power supplying line to which power is supplied.

Furthermore, the pallet has an area where the optical cord can coil itself; thus, a central slacking and extra part of the optical cord is kept in this area. On the other hand, the optical connector which has been assembled at the final assembling module 9 is inserted into the adaptor 1508 on the pallet to be fixed to it, and transferred.

The pallet has the above-mentioned structure, thus it has the following functions.

(1) Precisely holding the parts used for an optical connector which have various shapes at each process performed in turn.

(2) Precisely positioning the head of an optical cord with parts of the optical connector at each module.

(3) Heating the outer surrounding of a ferrule so as to join the ferrule and the optical fiber via a heat-curing adhesive.

(4) Transferring the crimp ring and the boot to a relevant module.

(5) Storing an extra-length part of an optical cord.

In addition, in the assembly and inspection system for optical connectors, modules are used in which cords to be connected with optical connectors are set by a pitch (spacing) of 250 mm; therefore, the spacings between two sets of heaters 1504 and two parts-holders 1501, both provided at both sides of the pallet, are set equal to 250 mm.

§1-4. Transfer mechanism

Figure 16:
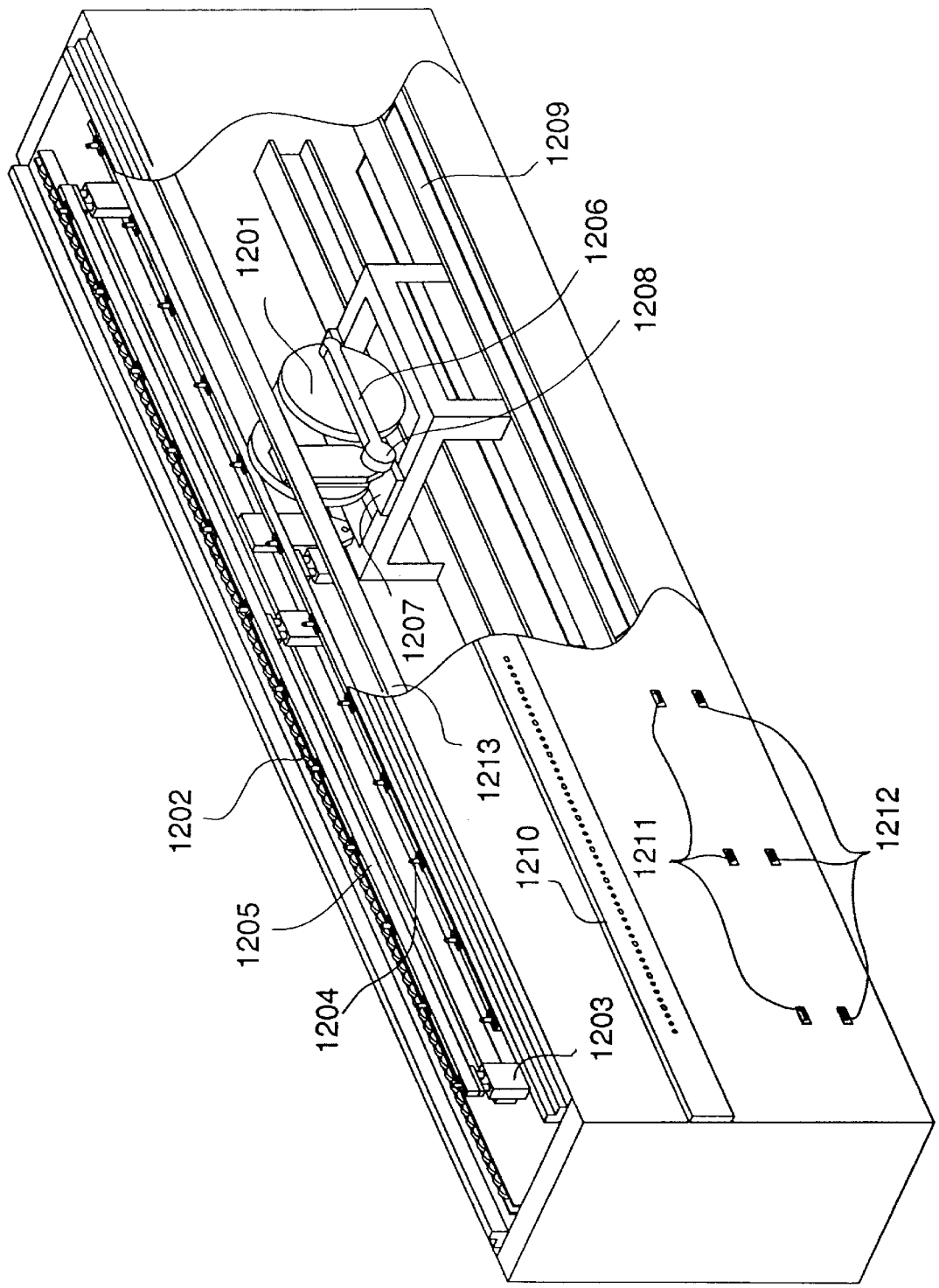
FIG. 16 is a perspective view of an example of the transfer mechanism according to the present invention.

An embodiment of the transfer mechanism which is combined with each module is shown in FIG. 16.

In the figure, reference numeral 1201 indicates a rotating disk, reference numeral 1202 indicates rotating rollers, reference numeral 1203 indicates an air cylinder, reference numeral 1204 indicates a feed pin, reference numeral 1205 indicates a transfer bar, reference numeral 1206 indicates a coupling rod, reference numeral 1207 indicates a rotating air actuator, reference numeral 1208 indicates a universal coupling, reference numeral 1209 indicates a pallet-return mechanism, reference numeral 1210 indicates a metal fitting for fixing modules, reference numeral 1211 indicates an electrical connector for a first communication line, reference numeral 1212 indicates an electrical connector for second communication lines, and reference numeral 1213 indicates an actuating rod.

The transfer mechanism 12 for transferring and positioning each pallet 15 to a predetermined position of each module may be operated by a transfer method called "the transfer bar method", or another method called "the free flow method". In this embodiment, a case adopting "the transfer bar method" which makes operations simple, can achieve high repetitive positioning accuracy, and can fix a pallet to the module for processing, will be explained.

The rotating direction of the rotating disk 1201 which is directly coupled with the rotating air actuator 1207 can be changed to either the clockwise or the counterclockwise direction by switching the air channel; therefore, the moving direction of actuating rod 1213 which is coupled with rotating disk 1201 via universal coupling 1208 and coupling rod 1206 can be changed to either the right or the left in the plane of the paper of the figure. On the other hand, transfer bar 1205 which is coupled with the actuating rod 1213 via air cylinder 1203 not only can move by the same distance to the same direction as those of the actuating rod 1213, but can also move in the vertical direction by switching the air channel.

Therefore, for example, in order to transfer the pallet from the right to the left in the figure, a situation in which a feed pin 1204 (plural feed pins 1204 are provided with each spacing of feed pitch) is inserted into insertion hole 1505 provided at the bottom surface of the pallet, that is, the air cylinder is moved in the upper direction, is first realized, and in this situation, the rotating air actuator is driven in a manner such that rotating disk 1201 rotates in the counter-clockwise direction. This rotational motion is converted via universal coupling 1208 to the right-to-left linear motion of the coupling rod 1206; thus, actuating rod 1213 which is directly coupled with the coupling rod 1206 and transfer bar 1205 which is coupled with the actuating rod 1213 via air cylinder 1203 move linearly from the right to the left. That is, the pallet into which the feed pin is inserted is transferred on rotating rollers 1202 in the leftward direction in the figure.

Next, when the air supply to the air cylinder 1203 is shut out, the air cylinder 1203 moves downward; thus, the feed pin 1204 is pulled out from the insertion hole of the pallet. Then, in this situation, rotating air actuator 1207 is driven so as to rotate the rotating disk 1201 in the clockwise direction. This rotational motion is converted via universal coupling 1208 to the left-to-right linear motion of the coupling rod 1206, which is the opposite directional motion with respect to the above case; thus, actuating rod 1213 which is directly coupled with the coupling rod 1206 and the transfer bar 1205 which is coupled with the actuating rod 1213 via air cylinder 1203 move linearly from the left to the sight and return to their original positions. That is, by combining the rotational motion of the rotating air actuator 1207 and the vertical motion of the air cylinder 1203, the pallet is transferred linearly on the rotating rollers 1202 to the left direction in the figure.

If it is assumed that the rotational angle of rotating actuator is 180 degrees, the transfer pitch becomes equal to the diameter of the rotating disk in the transfer bar method. When this transfer pitch is set equal to spacing L between the two parts-holders 1501 on the pallet (refer to FIG. 19A) or N*L (N is an integer), desirable results may be obtained in the present embodiment. On the other hand, regarding determination of spacing L, it is desirable to make it as small as possible from the point of view miniaturizing the transfer mechanism, the pallet, and so on. However, excessive reduction of the spacing causes a problem in that the regulated allowable bending curvature for the optical cord may not be satisfied. In consideration of the above conditions and a condition for the length of the pitch of the optical cord required for this system (i.e., pitch length of an optical cord for manufacture), desirable results can be obtained when the spacing L between the parts-holders 1501 is set within −50 mm~+100 mm with respect to the center value of 250 mm.

In adopting "the free flow method" which is different from the transfer method explained in this embodiment, it is necessary to provide a stopper mechanism at a stop position of the pallet in front of each module in order to perform a transfer control of the stop and transfer of the pallet; however, it is of course the case that similar effects to those of the present embodiment can be realized.

§1-5. Mechanical combination between the transfer mechanism and the modules

Figure 17:
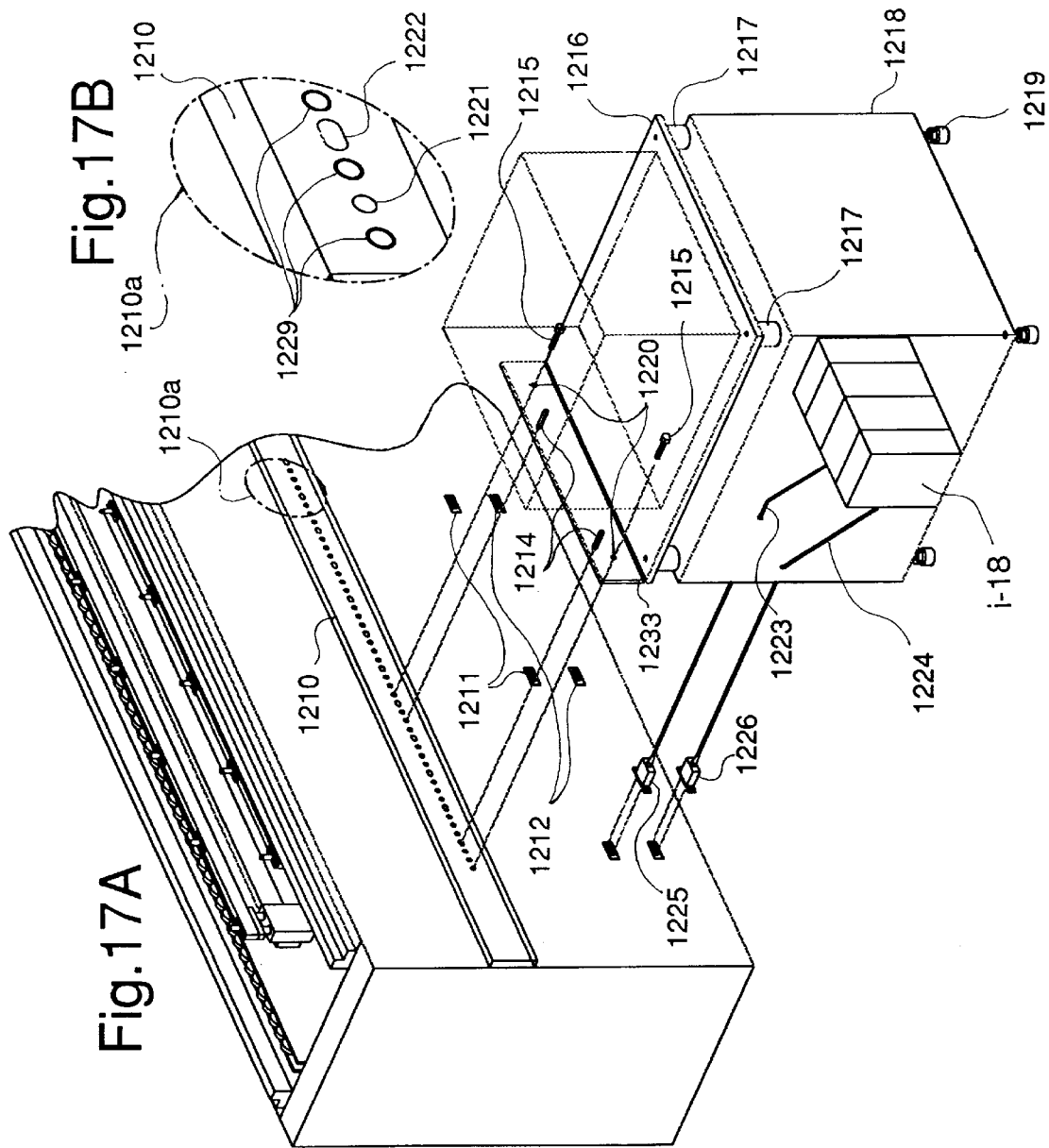
FIG. 17A is for the explanation of the method for combining each module with the transfer mechanism.
FIG. 17B is a partially enlarged view of the metal fitting 1210 for fixing modules.

FIG. 17A is for the explanation of the method for combining each module with the transfer mechanism. In the figure, reference numeral 1233 indicates a joint board at the module side, reference numeral 1214 indicates fastening pins, reference numerals 1215 indicate fastening bolts, reference numeral 1216 indicates a base plate of a module, reference numerals 1217 indicate elastic coupling materials, reference numeral 1218 indicates a module body, reference numeral 1219 indicates a module leveler, reference numeral 1220 indicates holes for fastening bolts, and reference numeral "i-18" indicates a module controller for the i-th module.

FIG. 17B is a partially enlarged view for the metal fitting 1210 for fixing modules, and reference numeral 1229 indicates tapped holes, reference numeral 1221 indicates a circular pin hole, and reference numeral 1222 indicates an elongated pin hole.

The method for combining each module with the transfer mechanism will be explained below in detail.

In the metal fitting 1210 for fixing modules, as shown in FIG. 17B, tapped hole 1229 and each pin hole are provided alternately and at regular intervals.

On the other hand, in the part for combination at the module side, the base plate 1216 is disposed on the module body 1218 having module leveler 1219 via elastic coupling materials 1217. In a side face of the base plate 1216 on which a mechanism for the module is disposed, joint board 1233 at the module side is fixed. In the joint board 1233, two fastening pins 1214 and two holes 1220 for fastening bolts are provided.

In order to combine the module with such a combination mechanism to the transfer mechanism, first, the leveler 1219 should be rotated so as to set the height of the module equal to that of the transfer mechanism and to insert the fastening pins 1214 into pin holes 1221/1222, and then the module should be pushed against the transfer mechanism and both are combined by fastening bolts 1215.

Generally, it is difficult to realize the complete adjusting of both positions; thus, occurrence of some position error is inevitable. Therefore, if such position error exists, four elastic coupling materials 1217 can function to suppress any deformation of the base plate 1216 of the module.

§1-6. System controller

Figure 3:
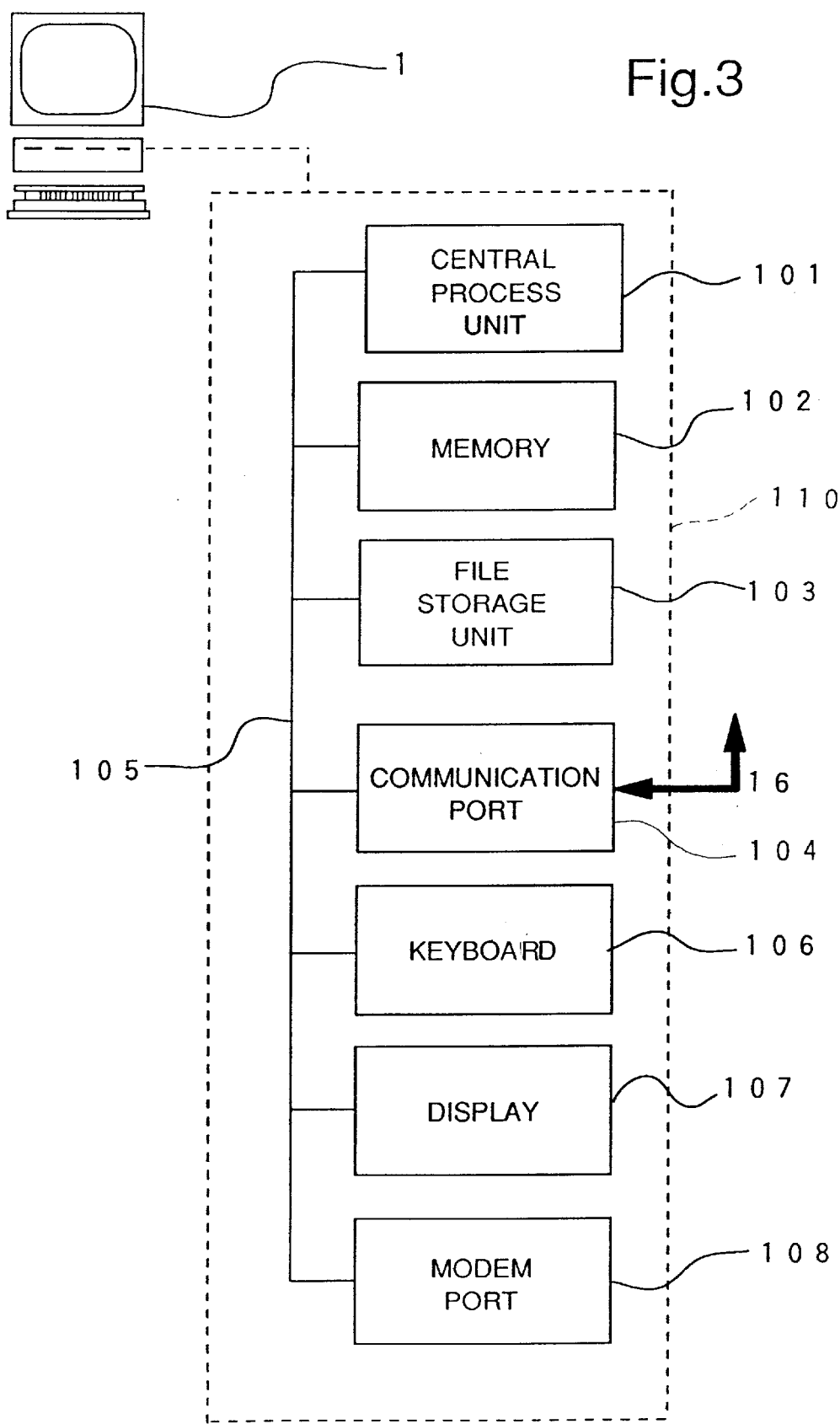
FIG. 3 shows an example of the internal structure of the system controller according to the present invention.
Figure 5:
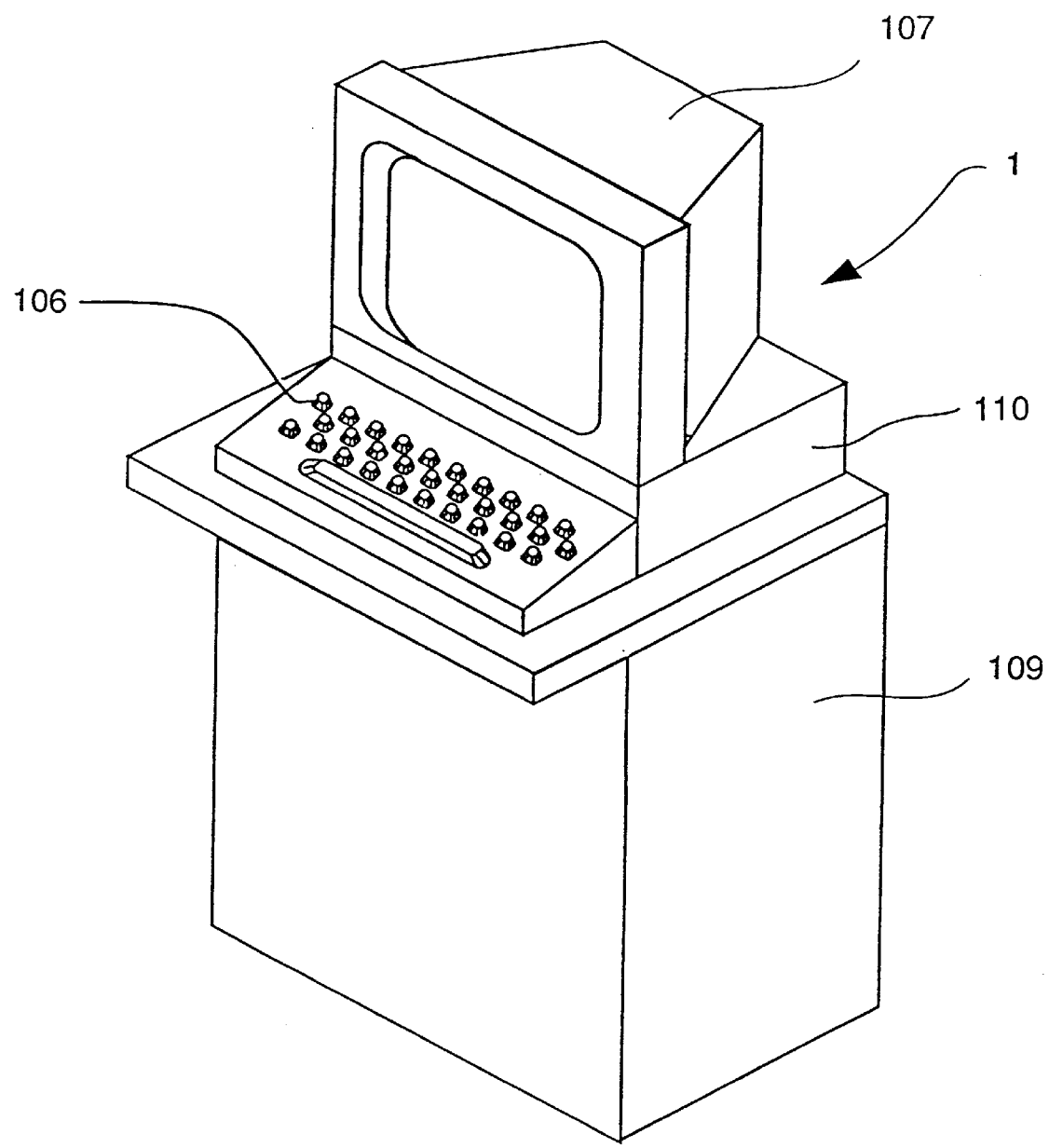
FIG. 5 is a perspective view of an example of the system controller according to the present invention.

FIG. 5 is a perspective view of an embodiment of the system controller for performing a supervised control, and FIG. 3 shows the internal structure thereof.

In the figures, reference numeral 106 indicates a keyboard, reference numeral 107 indicates a display, reference numeral 109 indicates a stand, and reference numeral 110 indicates a main body of the system controller. In the main body 110, central process unit (or CPU) 101, memory 102, file storage unit 103, communication port 104, internal bus 105, and modem port 108 are provided, and these can be replaced by a general personal computer.

When manufacture parameters such as the kind of optical connectors to be assembled, the length and the diameter of the optical cord, and the number of cords to be manufactured are input to the system controller 1 by an operator, the system controller 1 determines the manufacture parameters suitable for each module with reference to the manufacture parameter table which is stored for each kind of the optical connector in the storage unit. The determined manufacture parameters for each module (refer to FIGS. 28–31) are sent to each module in turn via the first communication line 16. The interface between the system controller and the controller for each module, the interface including the first communication line, and the response method of the system controller for an anomalous module will be explained hereinafter.

§1-7. Communication between the modules

An embodiment of the method for communication between the modules will be explained below.

Figure 2:
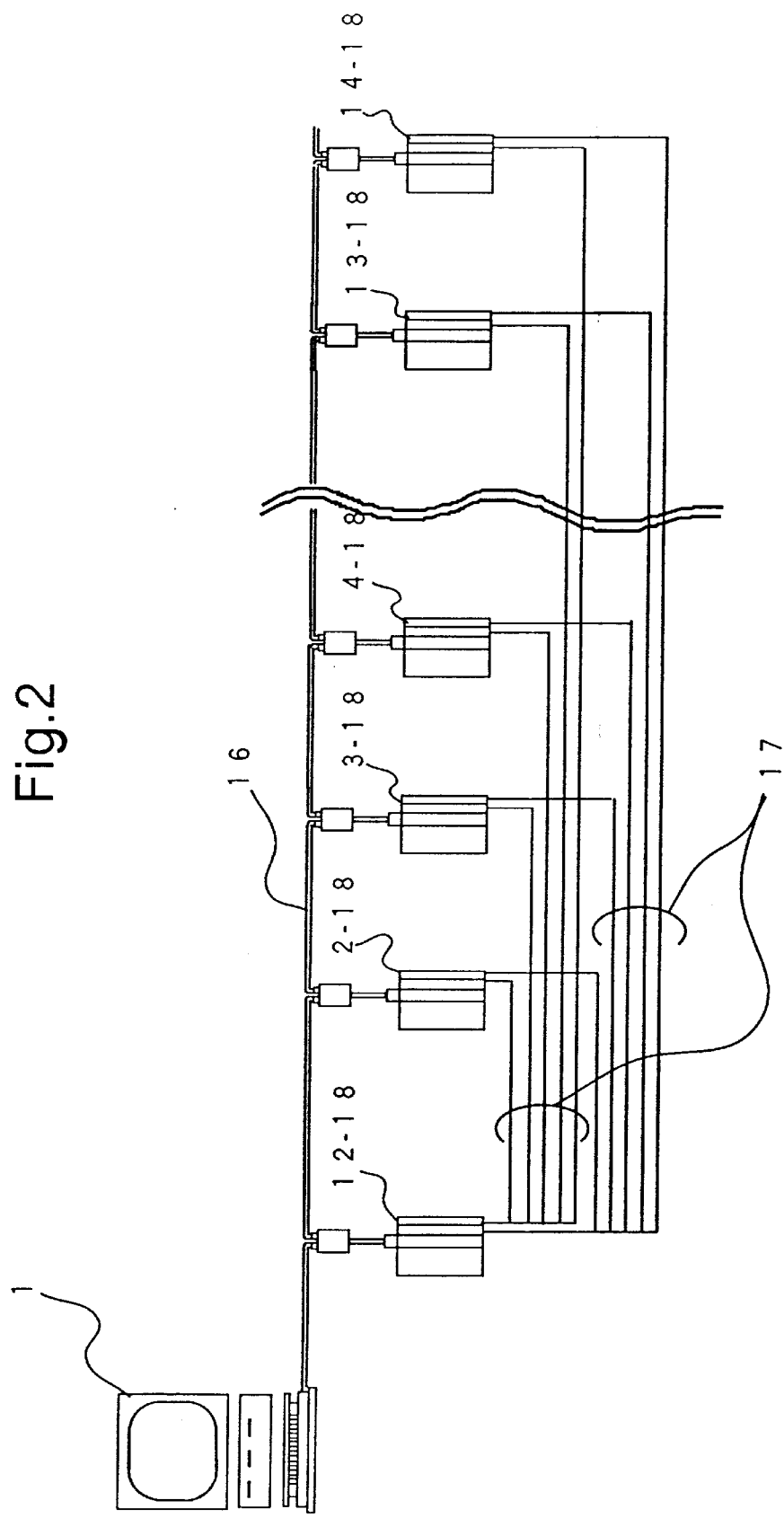
FIG. 2 is a block diagram of communication lines, showing an example of the control system according to the present invention.

FIG. 2 is a block diagram of communication lines, showing the embodiment of the control system, and reference numeral 1 indicates the system controller, reference numeral 16 indicates the first communication line, that is, an input/output line as the first communication means such as RS422 interface line, reference numeral 17 indicates second communication lines as the second communication means, and reference numeral i-18 indicates each module controller (in case of i=2~13 and 14, and each numeral corresponds to each number of the module shown in FIG. 1) and a transfer mechanism controller (in case of i=12).

The kind and the number of optical connectors to be assembled, the length and the diameter of the optical cord, and so on are transmitted from system controller 1 to each module (or transfer mechanism) controller (2-18~14-18) via the first communication line 16. In addition, management information for inspection data such as connection characteristics of assembled optical connectors, problem information generated at the malfunction of each module, and the like are transmitted from each module (or transfer mechanism) controller (2-18~14-18) to the system controller 1.

On the other hand, high speed operation is requested for synchronized operation between the mechanical motions of transfer mechanism 12 and each module; thus, the operation is performed via the second communication lines 17 in which general output and input units for the transfer mechanism and general input and output units for each module are directly connected, respectively. In this embodiment, A1SX42 (input unit) and A1SY42 (output unit), both available from Mitsubishi Electric Co., were used as the general input and output units.

Figure 4A:
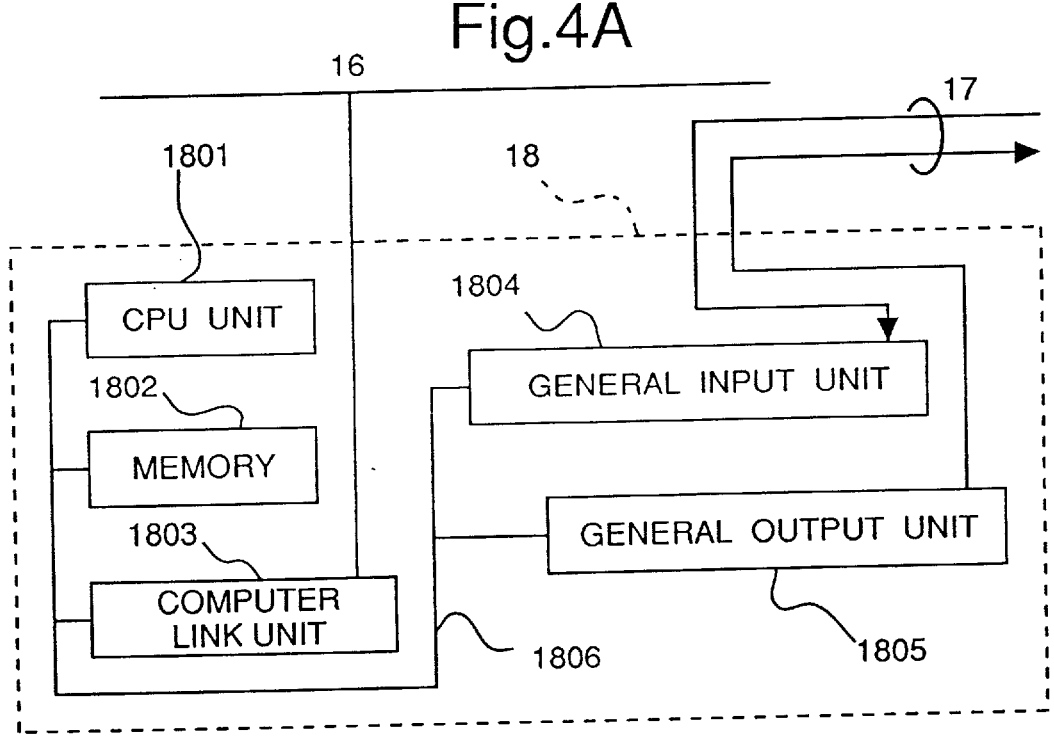
FIGS. 4A and 4B show an example of the internal structure of each module controller according to the present invention.
Figure 4B:
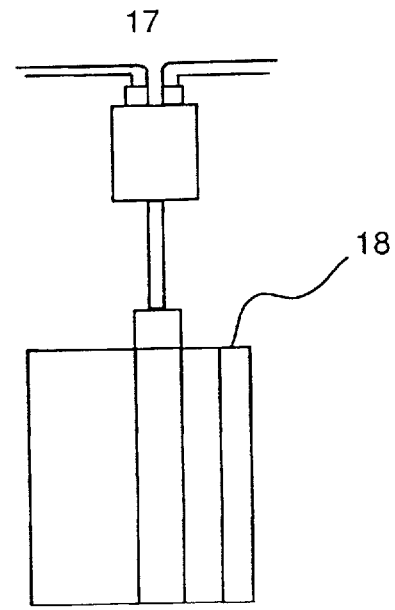

FIGS. 4A and 4B show an embodiment of the module controller, and reference numeral 1801 indicates a CPU unit, reference numeral 1802 indicates a memory, reference numeral 1803 indicates a computer link unit, reference numeral 1804 indicates a general input unit, reference numeral 1805 indicates a general output unit, and reference numeral 1806 indicates an internal bus. This module controller can be replaced by the so-called sequencer.

FIGS. 28–32 show manufacture parameters and measuring parameters which are transmitted from the system controller to each module via the first communication line, and FIG. 33 shows the names of signals which are transmitted and received between the transfer mechanism controller and each module controller via the second communication lines.

The system controller and the module and transfer mechanism controllers are combined one after another via the first communication line 16. To explain in more detail, the communication port 104 which is a component of system controller and the computer link unit 1803 which is a component of each module (or transfer mechanism) controller are combined one after another via a serial communication line (for example, RS-232C, PS422, etc.) As such a communication medium, any electric communication line whose communication cost is low, or any optical communication line which is not susceptible to interference by electrical noises from outer surroundings may be used.

On the other hand, regarding the connection between transfer mechanism controller 12-18 and each module controller i-18 (i=2~14 except for 12), the output unit of the transfer mechanism controller and the input unit of each module controller, and the input unit of the transfer mechanism controller and the output unit of each module controller are respectively combined via a parallel communication network.

§1-7-1. Control by using the first communication line Transmission

When the system controller 1 transmits the manufacture parameters to each module controller via the first communication line, signals relating to the following items are transmitted in turn: (1) start of communication→(2) module address→(3) address of system controller→(4) command code→(5) table address→(6) data length→(7) data→(8) end of communication.

Here, signal for the "module address" is provided for designating a module (or transfer mechanism) controller which receives the manufacture parameter being sent after this, and is necessary in a case in which the module controllers are connected one after another via one communication line as the present embodiment. If adopting a multiple system in which plural system controllers are combined with the first communication means (line) for realizing a highly reliable system, the address of the system controller of the third procedure (i.e., the above (3)) is sent to a module (or transfer mechanism) controller to be communicated in order to identify individual system controllers. The command code of the fourth procedure is an operation request designated by the system controller to a module (or transfer mechanism) controller, and command codes used in this embodiment are shown in FIG. 34.

The table address of the fifth procedure is the address of a memory area for storing data to be send, such as manufacture parameters. In FIGS. 28–31, the table addresses corresponding to the manufacture parameters to be transmitted to the modules are shown. The data length of the sixth procedure means a length of data to be transmitted after this item, and corresponds to "data length" for each manufacture parameter shown in FIGS. 28–31. The data of the seventh procedure means practical transmitted data such as manufacture parameters. The signal for the end of communication of the eighth procedure is a terminator signal which means the end of communication between the system controller and each module (or transfer mechanism) controller, and Ascii codes "CR" and "LF" are desirable.

Response example

The module (or transfer mechanism) controller which received data such as manufacture parameters returns the receiving status via the first communication line with the following procedure.

With respect to the transmission from the system controller to each module (or transfer mechanism) controller, an embodiment of the response of each module (or transfer mechanism) controller to the system controller will be explained in both cases of successful receiving and unsuccessful receiving.

Case of successful receiving

If the data length received in the sixth procedure and the number of data received in the seventh procedure agreed, and the module (or transfer mechanism) controller receives the terminator signal, the module (or transfer mechanism) controller returns signals relating to the following items in turn to the system controller: (1) start of response→(2) module address→(3) address of the system controller→(4) command code→(5) table address→(6) the number of data→(7) measurement data→(8) end of response→(9) end of communication.

Here, the signal for the start of response of the first procedure is a signal (STX) indicating the start of response operation. The second, third, and seventh procedures are the same as the above corresponding procedures in case of the transmission; thus, the explanation for them will be omitted here.

The number of data and the measured data in the fifth and sixth procedures are the number of measured values and the contents of measurement, respectively, when system controller requests measurement data and the like from a specific module, as shown in FIG. 32, and for a command which does not request any response data, a status byte of each module is sent back.

The signal for the end of response of the eight procedure is a signal (ETX) which means the end of the response operation. Through the consecutive communication from the STX to the ETX, the system controller confirms that the transmitted signals were correctly received by the module (or transfer mechanism) controller as a communication partner, and terminates the communication.

Case of unsuccessful receiving

If the data length received in the sixth procedure and the number of data received in the seventh procedure did not agree, or the module (or transfer mechanism) controller could not receive the terminator signal in a predetermined time, the module (or transfer mechanism) controller returns signals relating to the following items in turn to the system controller: (1) receiving impossible→(2) module address (3) address of the system controller→(4) end of communication.

Here, the signal for the "receiving impossible" of the first procedure is a signal (NAK) which is sent when the receiver controller judges that a part or the whole of the data sent by the system controller was wrong. As a method for judging the defectiveness of communication, a known technique such as parity check of the received signal and observation of response within a predetermined time by providing a watchdog timer can be used; therefore, more detailed explanation for it will be omitted here. The second to the fourth procedures are the same as the above corresponding procedures, and the explanation for them will also be omitted here.

§1-7-2. Control by using the second communication lines

Figure 24:
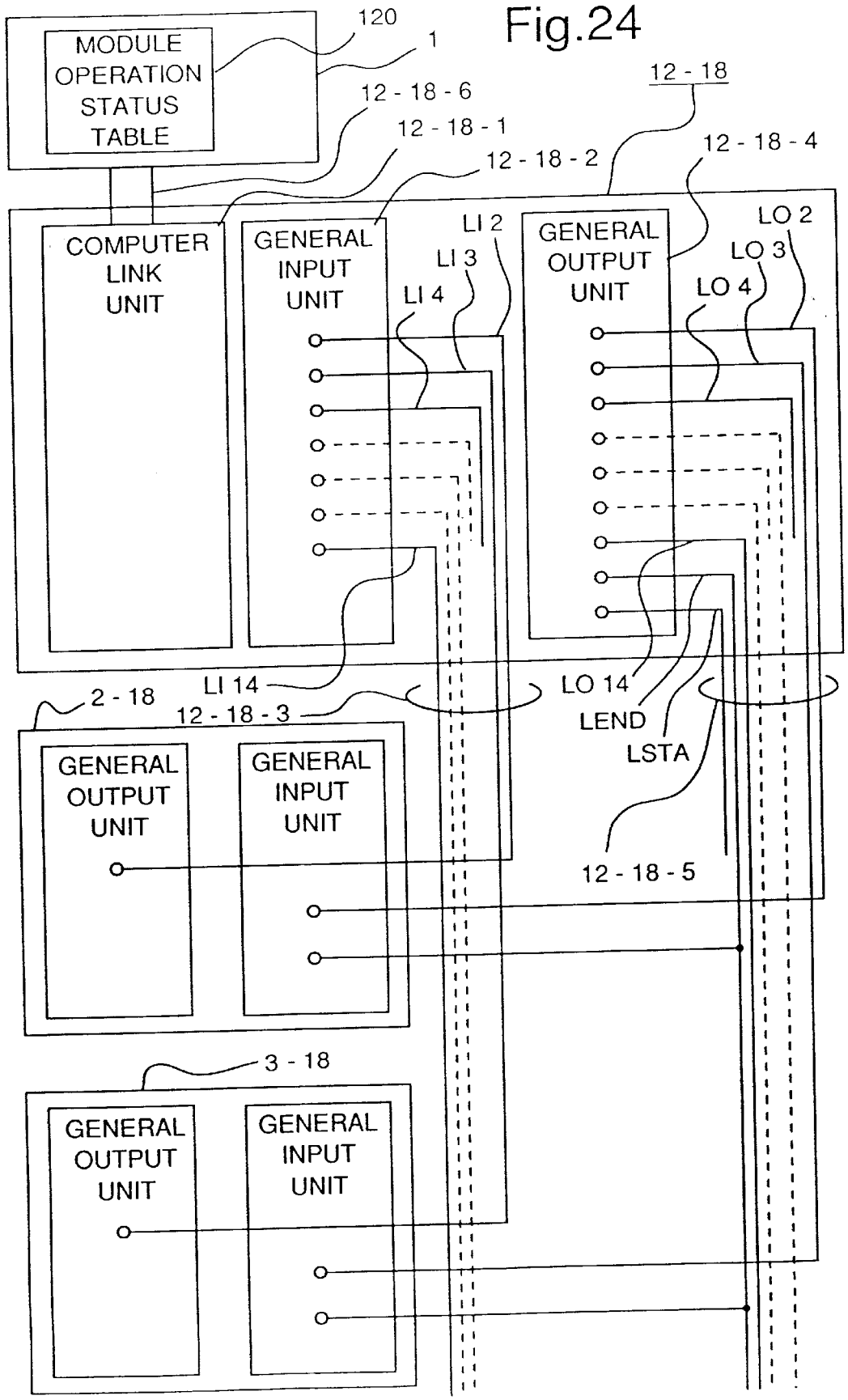
FIG. 24 is for the explanation of the configuration of an example of the second communication lines according to the present invention.

FIG. 24 shows an embodiment of the second communication lines, and FIG. 25 shows an embodiment of a module operation status table prepared in (memory 102 of) the system controller.

In FIG. 24, reference numeral 12-18 indicates the transfer mechanism controller, reference numeral 12-18-1 indicates a computer link unit, reference numeral 12-18-2 indicates a general input unit, reference numeral 12-18-3 indicates an input cable, reference numeral 12-18-4 indicates a general output unit, reference numeral 12-18-5 indicates an output cable, reference numeral 12-18-6 indicates a calculator cable, reference numeral 1 indicates the system controller, and reference numeral 120 indicates a module operation status table.

In addition, reference symbols LI2–LI14 indicate lines which combine the general input unit of the transfer mechanism controller and the output unit of each module controller, and reference symbols LO2–LO14 indicate lines which combine the general output unit of the transfer mechanism controller and the input unit of each module controller. Next, reference symbols LEND and LSTA indicate lines for transmitting a transfer completion signal and starting display from the general output unit of the transfer mechanism controller to the general input unit of each module controller.

The module operation status table logically has a table-like structure, as shown in FIG. 25, and in the figure, each stop position of the pallet is shown in the "column" direction of the table, while each transfer time of the pallet is shown in the "row" direction of the table. Each element in the module operation status table indicates presence/absence of the optical cord to be processed, that is, "1" means that the optical cord to be processed is present at the stop position of the pallet, while "0" means that the optical cord to be processed is absent at the stop position of the pallet.

Generally, as far as no error in manufacturing occurs, the optical cord to be processed on the pallet is transferred to the rear modules in turn; thus, the position of "1" in the module operation status table proceeds in the right-downward direction according to the progress of the transfer time.

Immediately before the transfer mechanism transfers each pallet, the system controller 1 transmits a signal indicating an operation status of the module (GO/NG for the process at each transfer time of the pallet) to the transfer module controller 12-18 via calculator cable 12-18-6 and computer link unit 12-18-1. The content of this transmitted module operation status signal is written in the general output unit 12-18-4 via the CPU unit of the transfer mechanism controller, and is transmitted to the general input unit of each module controller. When such a pre-process for the transfer is completed, the transfer mechanism performs the transfer of each pallet.

The transfer completion signal is transmitted from the similar general output unit as in the case of the module operation status signal to each module via the output cable; therefore, after each module receives the transfer completion signal, if the module can judge that the optical cord which can be processed has been positioned according to the module operation status signal, the module pulls in the optical cord from the pallet and performs the specified process. On the other hand, this transfer completion signal is also transmitted to the system controller 1 via the calculator cable. The system controller which received the transfer completion signal then renews the contents of the module operation status table and the transfer time of the pallet.

After the predetermined process has been completed at each module, the optical cord is returned to the pallet again and is set at the given position by an optical cord grip hand, and then the operation completion signal is returned from the output unit of each module controller to the general input unit 12-18-2 of the transfer mechanism controller via input cable 12-18-3. The transfer mechanism controller which received the operation completion signals from all the modules via the general input unit repeats the similar procedures to those explained above with the system controller, and transfers each pallet again so as to continue the assembly and inspection processes.

On the other hand, if any process error occurred in a course of the process, or any module has fallen into an anomalous state, the operation completion signal is not transmitted from the relevant module. Therefore, the transfer mechanism controller which confirmed that the operation completion signal does not appear at a relevant contact point of the general input unit 12-18-2 within a predetermined time transmits an interruption signal to the system controller 1 via the computer link unit. The system controller which received the interruption signal inputs bit information (indicating the operation completion signal from each module) of the general input unit of the transfer mechanism controller via the computer link unit, and specifies the damaged module. Next, the system controller inputs a status byte from the module controller of the damaged module via the above-mentioned first communication line, analyses the status of the damage, and judges that the damage is temporary damage which can be repaired, or an eternal damage which can never recovered.

In the case in which the recovery is possible, the system controller rewrites the relevant element of the module operation status table from "1" to "0", and then again transmits a signal indicating the operation status of the module (GO/NG for the process at each transfer time of the pallet) to the transfer module controller 12-18 via calculator cable 12-18-6 and computer link unit 12-18-1, and restarts the operation. Any pallets which were damaged before reaching the removal module are collected by the removal module (detailed explanation of this module will be presented afterwards). The object for the collection at the removal module is a pallet which satisfies the "AND" condition for both when (i) the pallet was positioned in front of the module and (ii) the operation status signal is "0".

As explained above, the present invention can have a first communication means which enables the system controller and each module controller to communicate a large quantity of data, and a second communication means for high speed data, and thus the first communication means may be used for requests such as a few communication frequencies, a large quantity of data, and low communication speed, while the second communication means may be used for such a request as many communication frequencies, small quantity of data, and high communication speed. Therefore, a low cost communication system can be constructed.

In addition, the manufacture parameters are stored in "table" form so as to transmit the manufacture parameters to a module in a necessary situation; thus, there is a merit to rapidly and accurately deal with any change of manufacture conditions.

Furthermore, the lot number (manufacturing number) is managed by the system controller, and a relevant lot number is used for making data for inspection modules and is used for printing of the lot number by the stamping module. Therefore, the correspondence between the lot number and inspection data can be completely obtained, and the measured data is directly written in the file storage unit without human help; thus, a highly reliable manufacture managing system can be constructed.

§1-8. Electrical connection between the transfer mechanism and the modules of the first embodiment As stated above, it is necessary to combine the system controller 1 and the module controllers by using the first and second communication lines.

The connection method between the module controllers under the first communication line is the so-called multi-laid connection. The module controller i-18 can be connected with the system controller 1 by combining connector 1225 having communication line 1223 with electrical connector 1211 for the first communication line with respect to the multi-laid connection, provided on the side face of the transfer mechanism as shown in the aforementioned FIG. 17A.

On the other hand, the connection method between the transfer module controller 12-18 and module controller i-18 under the second communication lines uses "multi-laid" and "one-by-one" connections together. Therefore, by connecting the second connector 1226 having communication line 1224 with electrical connector 1212 for the second communication lines with respect to the multi-laid connection, provided on the side face of the transfer mechanism, the connector 1226 having pin-connections as shown in FIG. 33, the general output and input ports of each module controller can be connected with the general input and output ports of the transfer mechanism. Additionally, it is desirable that the first and second communication lines in the transfer mechanism be provided in a channel made of good conductor material in order to decrease the influence of noise from the surrounding environment.

§1-9. Structure of each module

Hereinafter, each embodiment of the modules which can bring desirable effects when used in the present embodiment will be shown in FIGS. 5–15 and 18.

Figure 6:
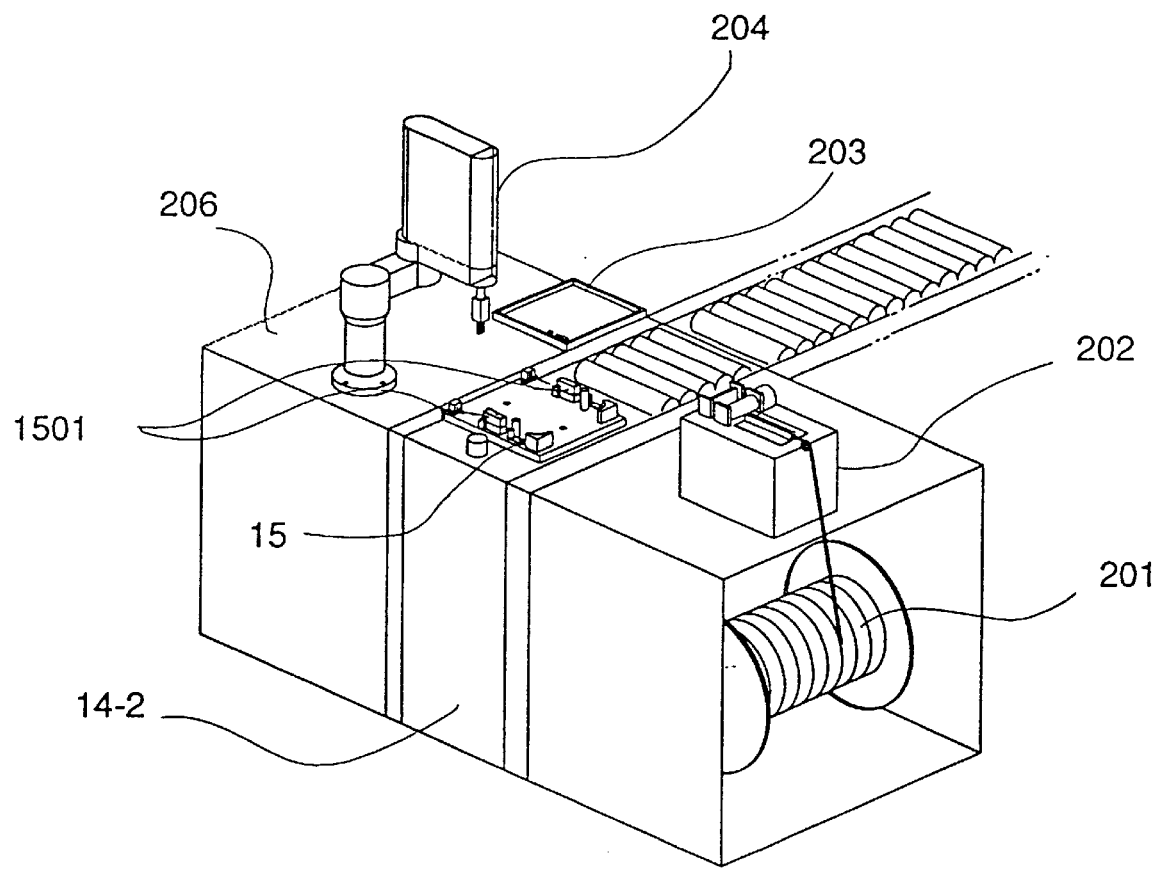
FIG. 6 is a perspective view of an example of the required-length cutting module according to the present invention.
Figure 7:
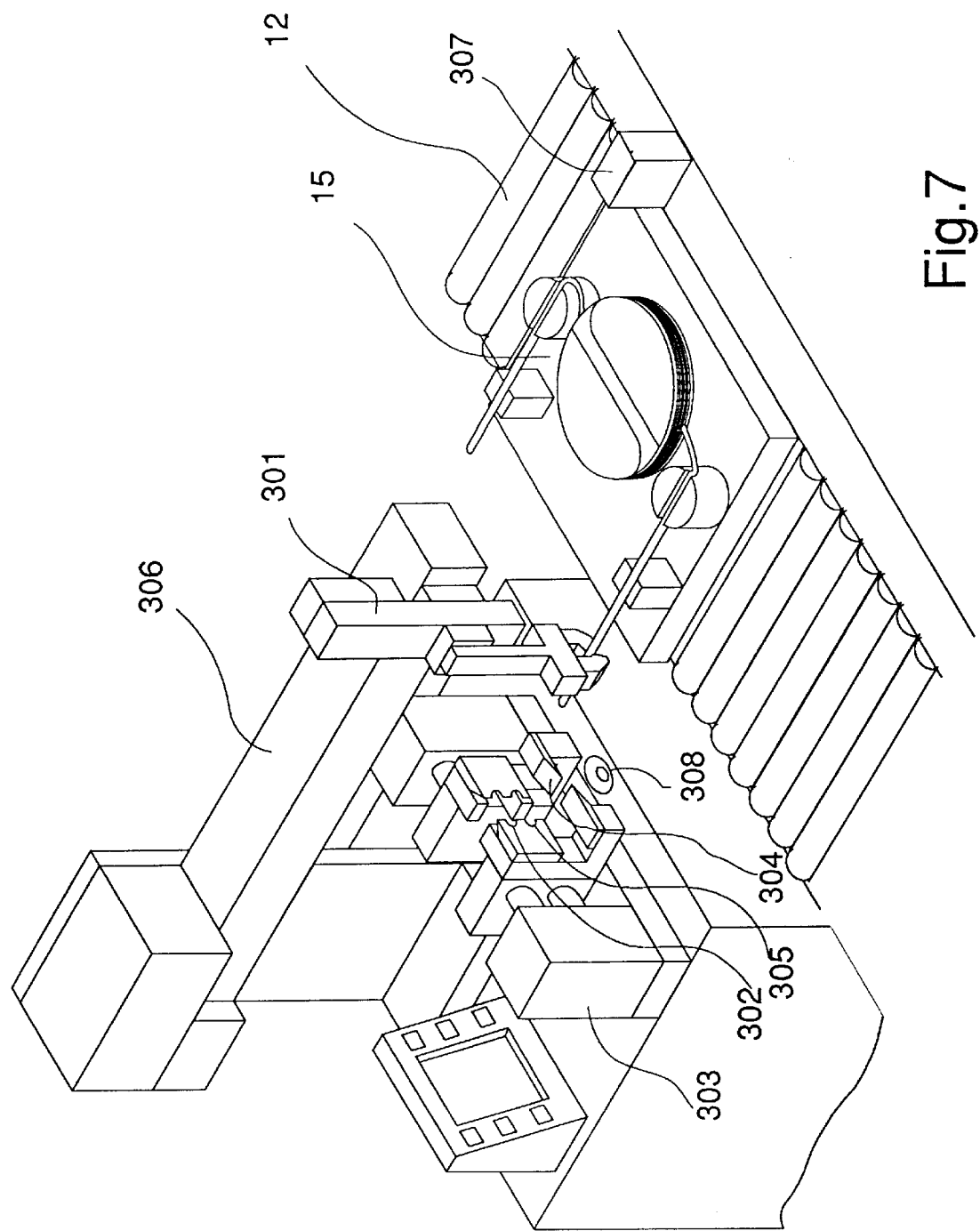
FIG. 7 is a perspective view of an example of the pre-processing module according to the present invention.
Figure 8:
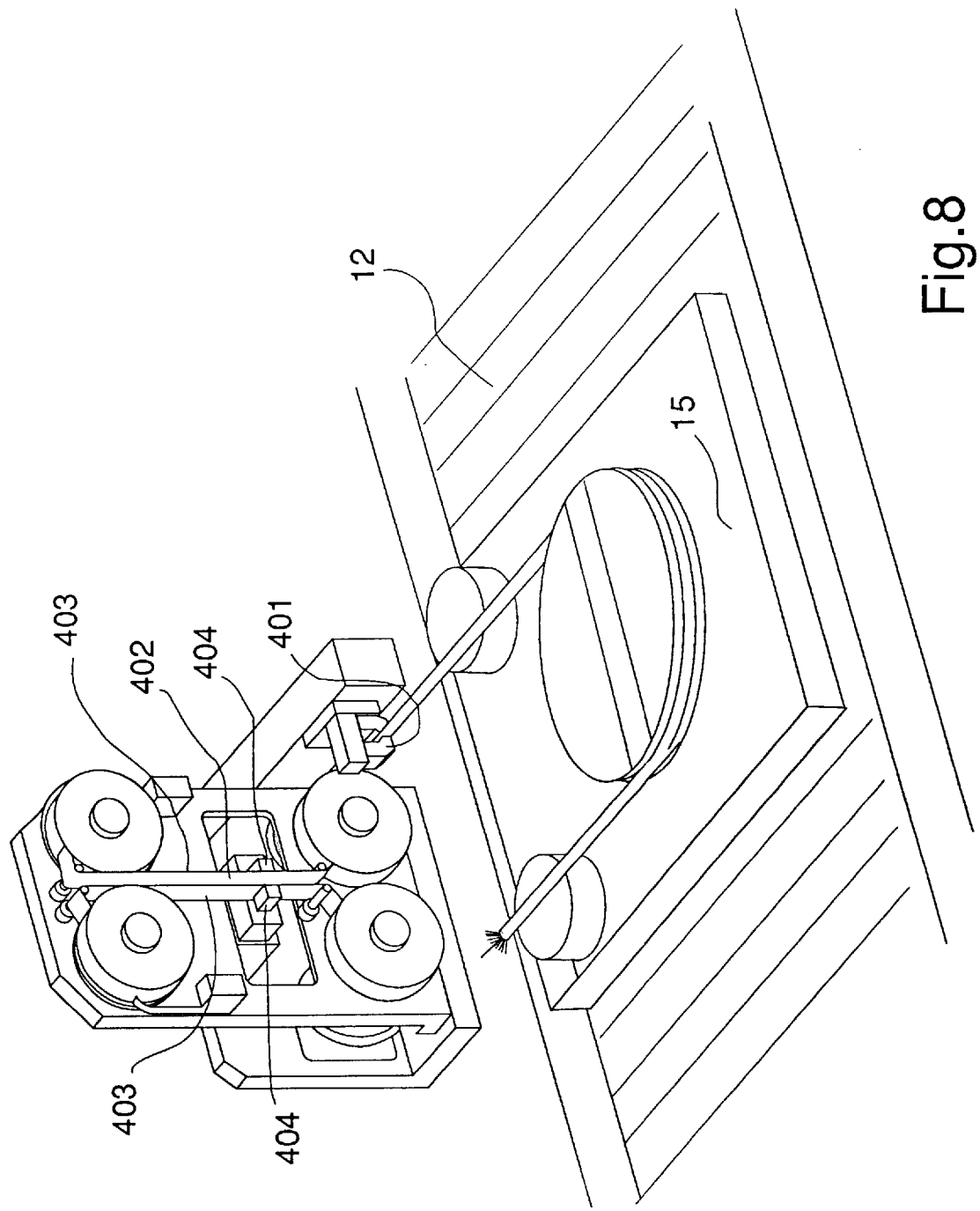
FIG. 8 is a perspective view of an example of the cleaning module according to the present invention.
Figure 9:
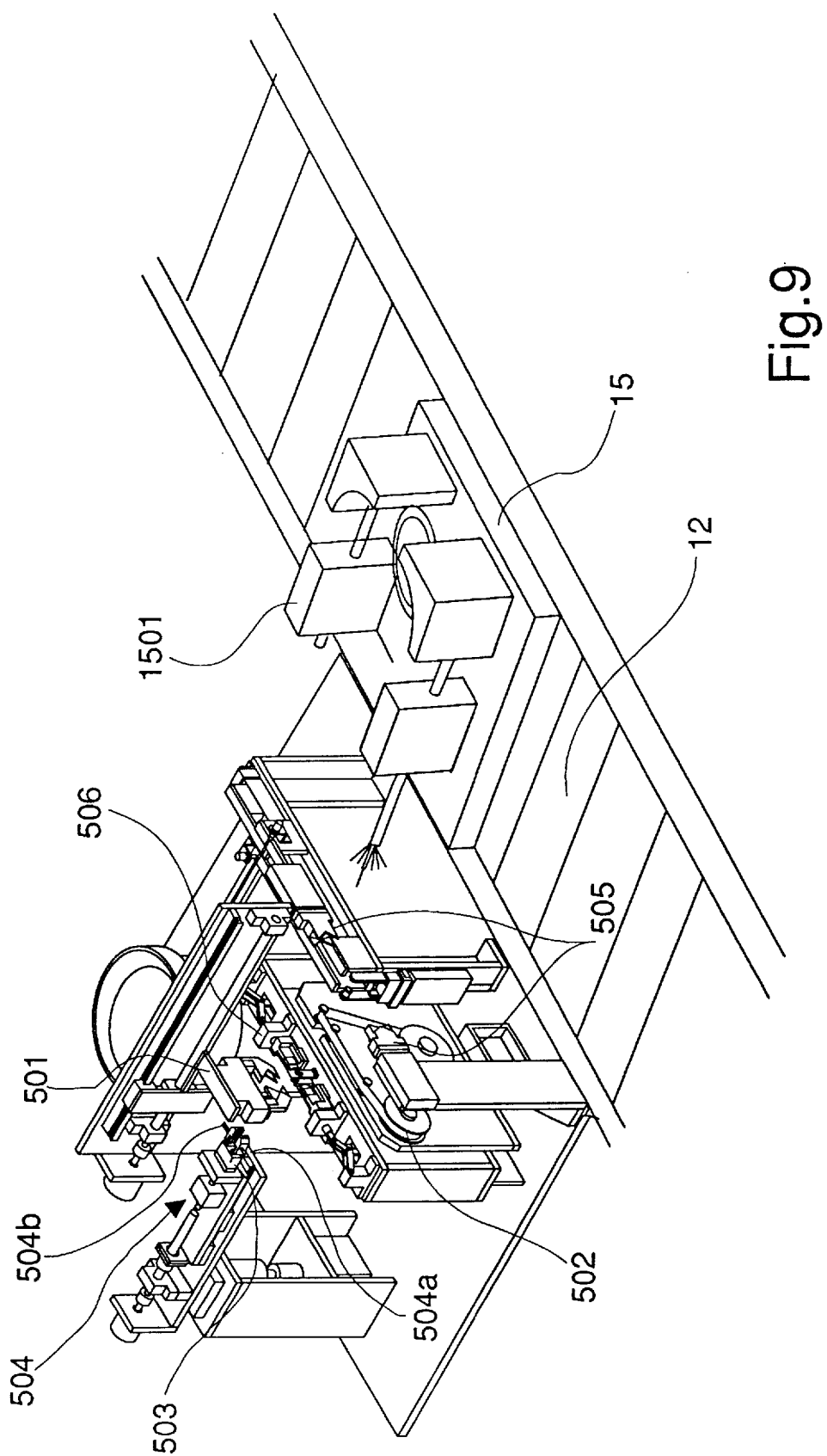
FIG. 9 is a perspective view of an example of the insertion module according to the present invention.
Figure 10:
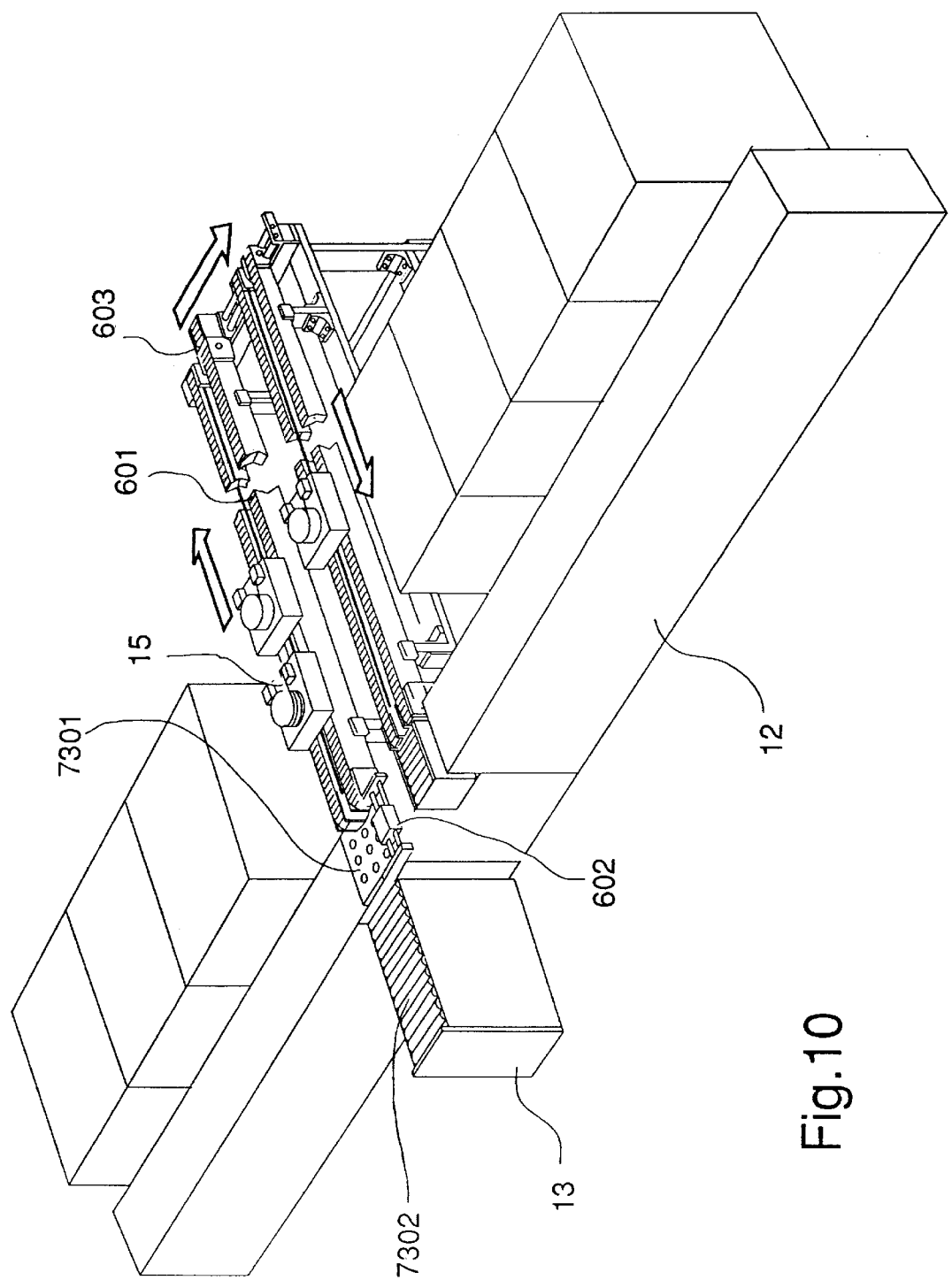
FIG. 10 is a perspective view of an example of the curing and removal modules according to the present invention.
Figure 11:
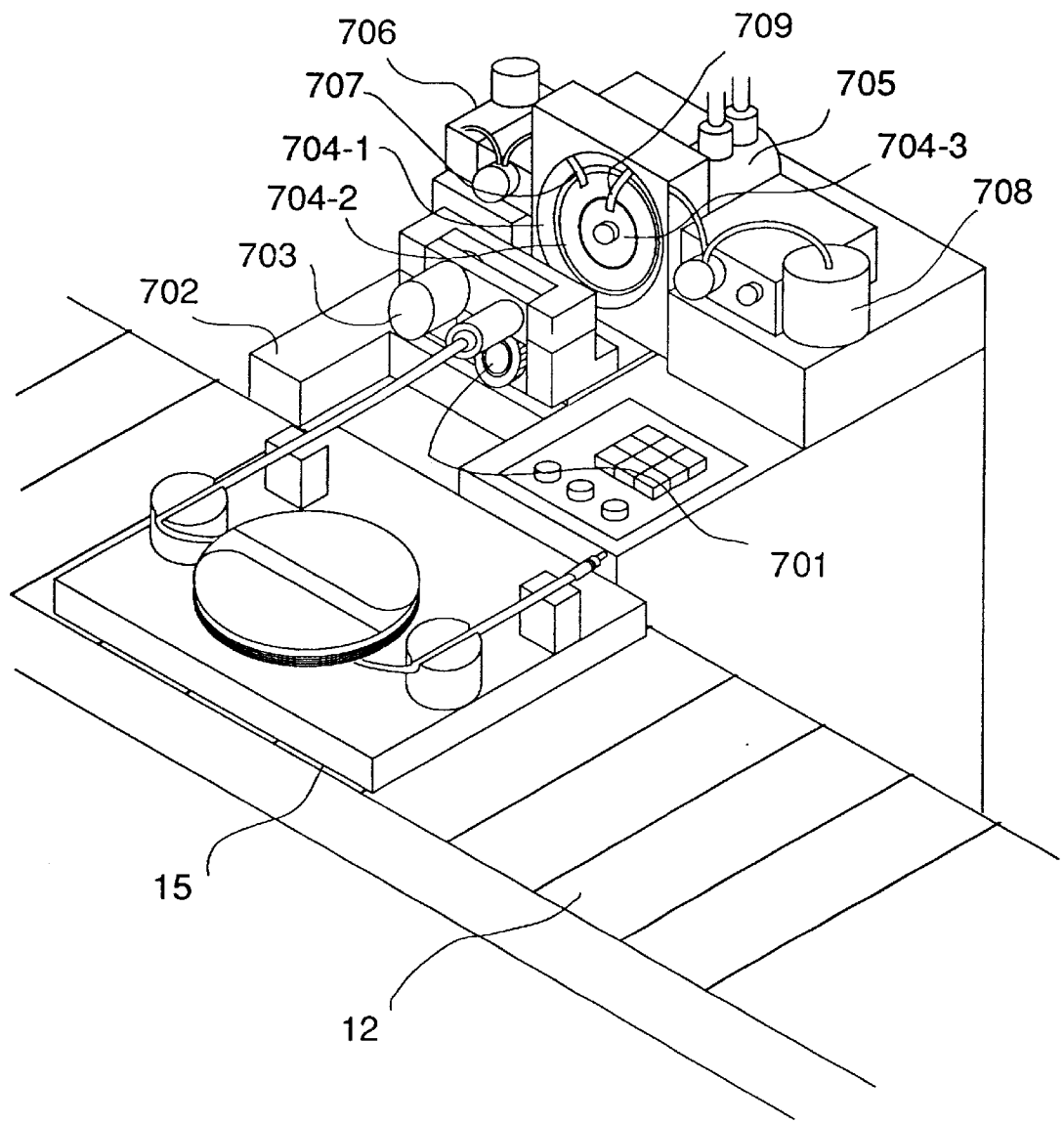
FIG. 11 is a perspective view of an example of the polishing module according to the present invention.
Figure 12:
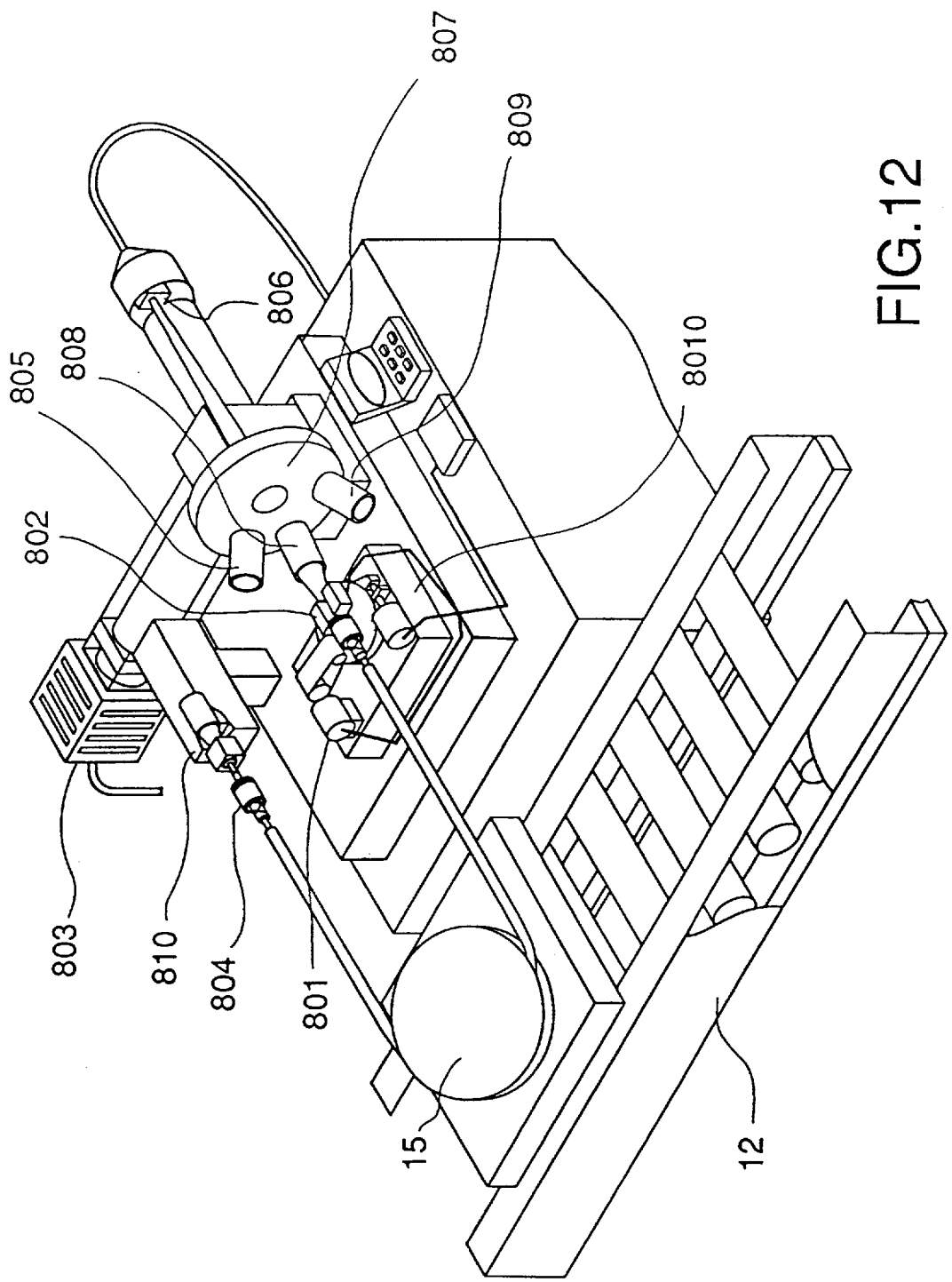
FIG. 12 is a perspective view of an example of the polished surface inspection module according to the present invention.
Figure 13:
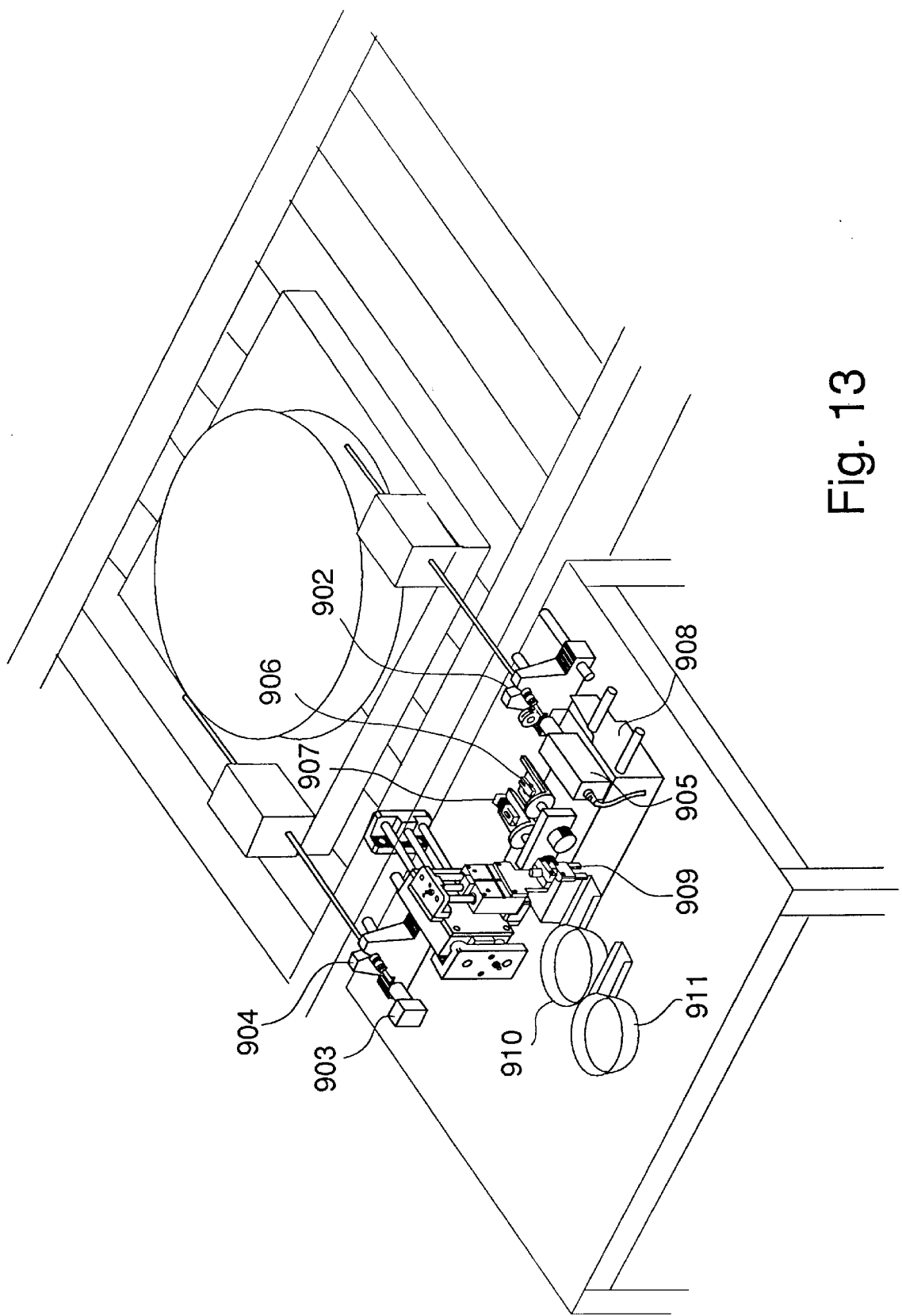
FIG. 13 is a perspective view of an example of the final assembling module according to the present invention.
Figure 18:
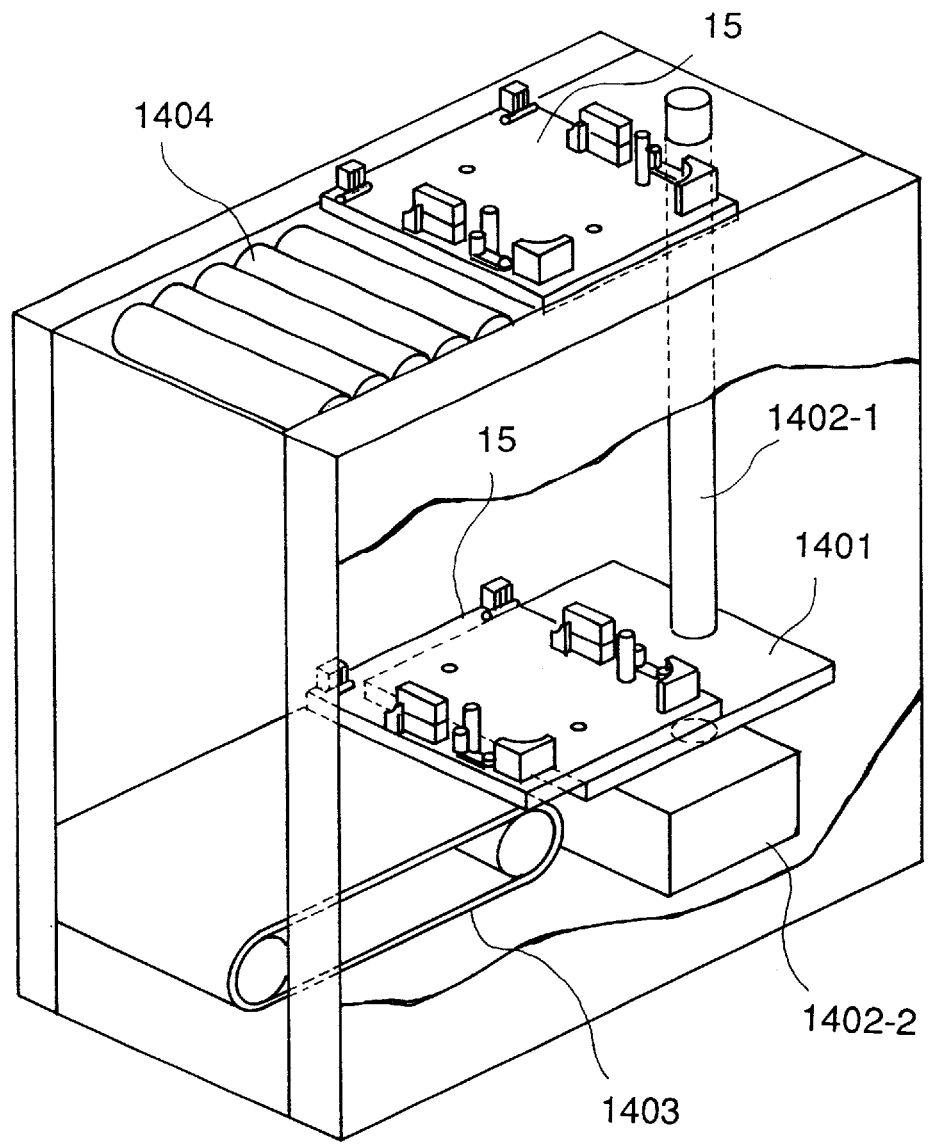
FIG. 18 is a perspective view of an example of the elevating module according to the present invention.

That is, FIG. 5 is a perspective view of the embodiment of the system controller, FIG. 6 is a perspective view of the embodiment of the required-length cutting module, FIG. 7 is a perspective view of the embodiment of the pre-processing module, FIG. 8 is a perspective view of the embodiment of the cleaning module, FIG. 9 is a perspective view of the embodiment of the insertion module, FIG. 10 is a perspective view of the embodiment of the curing module, FIG. 11 is a perspective view of the embodiment of the polishing module, FIG. 12 is a perspective view of the embodiment of the polished surface inspection module, FIG. 13 is a perspective view of the embodiment of the final assembling module, FIG. 14 is a perspective view of the embodiment of the optical performance evaluation module, FIG. 15 is a perspective view of the embodiment of the stamping module, and FIG. 18 is a perspective view of the embodiment of the elevating module.

These modules may be existing facilities, or any facilities which are newly designed and manufactured so as to realize the functions shown in §1-1. That is, in the present invention, the practical method of constructing each individual module is not an object of the invention, but the system integration technique of the optical connector assembly and inspection system using those modules, such as a method for communicating between the modules, an electrical and mechanical combination method between each module and the transfer mechanism, is an object of the invention. Therefore, the form of each module used in the present invention is not necessary to be the same as a form which will be explained below, and it is of course the case that the effectiveness of the present invention is not lost if any modules which can realize the individual functions shown in §1-1 are used as structural components shown in FIG. 1.

Additionally, in the following explanation in connection with each module, both heads of one optical cord installed on a pallet are treated in the same way in turn; therefore, it should be noted that the explanation for one side applies to the other side as well. Also, in the following explanation, a "ferrule" means a "pre-assembled ferrule" in which a ferrule, a spring, and a stop ring are previously combined by using a spring mechanism.

§1-9-1. Required length cutting module

The embodiment of the required-length cutting module 2 is shown in FIG. 6. In the figure, reference numeral 201 indicates a cord winding drum, reference numeral 202 indicates a required-length cutter, reference numeral 203 indicates a pallet for parts, and reference numeral 204 indicates a robot. FIG. 6 also shows elevating module 14-2 on which pallet 15 having parts-holders 1501 is disposed.

In the configuration of the required-length cutting module, the required-length cutter 202 for cutting an optical cord to a required length and a part for supplying some of the parts for the optical connector to the pallet by the robot face each other with the elevating module 14-2 between.

In the required-length cutting module 2 mounted with the cord winding drum 201 on which the optical cord is wound, the optical cord is cut by the required-length cutter 202 according to the information relating to the length of optical cord, which was transmitted from the system controller 1 via the first communication line 16. Next, in the required-length cutting module 2, a boot and a crimp ring corresponding to the information relating to the kind of optical connector, which was transmitted from the system controller 1 via the first communication line 16, are taken from the pallet 203 for parts by the robot 204, and are installed at a predetermined area on the parts-holder 1501.

Furthermore, the required-length cutting module 2 makes the robot 204 grasp the head of the optical cord and insert it into the parts-holder 1501, and makes a pulley driver (not shown) provided at the elevating module 14-2 rotate the idler pulley 1506 on the pallet (refer to FIG. 19A) so as to push the optical cord caught by the pinch roller 1507 from the boot side into the crimp ring side in a manner such that the head of the optical cord protrudes from the crimp ring by a specified length. After that, the pallet on which some parts of the optical connector and the optical cord are installed is forced out to the transfer mechanism 12 by the elevating module 14-2.

§1-9-2. Pre-processing module

The embodiment of the pre-processing module 3 is shown in FIG. 7. In the figure, reference numeral 301 is an optical cord grip hand, reference numeral 302 indicates a cutter for PVC Sheath, reference numeral 303 indicates an air cylinder, reference numeral 304 indicates a thermal cutter for aramid yarns, reference numeral 305 indicates a cutter for polyamide, reference numeral 306 indicates a transport mechanism for optical cord grip hand, reference numeral 307 indicates a pallet detecting sensor, and reference numeral 308 indicates an air aspirator.

When the pallet with the optical cord is positioned at a specified area in front of the pre-processing module 3 by the transfer mechanism 12, the controller 3-18 for the pre-processing module receives the "transfer completion" signal transmitted from the transfer mechanism controller 12-18 via the second communication lines. The arrival of the pallet is confirmed according to the receiving of this signal and a detection signal output from the pallet detecting sensor 307 attached to the front part of the pre-processing module. This control of transferring the pallet performed between the pre-processing module and the transfer mechanism is also performed in the completely same way between the other module and the transfer mechanism; thus, the explanation relating to it will be omitted in the following explanation for each module.

Next, the optical cord grip hand 301 moves from the side of the pre-processing module 3 to above the pallet, grasps a predetermined part of the optical cord on the pallet, and positions it at the cutter 302 for the PVC Sheath. The cutter 302 is fixed at the air cylinder 303 which is engaged in opening and closing movements; thus, the PVC Sheath of the optical cord is cut by the closing motion of the air cylinder 303, and according to the backward motion of the optical cord grip hand 301, the optical cord is separated from the cut PVC Sheath.

The optical cord whose PVC Sheath was cut and removed is then positioned at the thermal cutter 304 by the optical cord grip hand 301 in order to cut the aramid yarns. The thermal cutter 304 is fixed at the air cylinder 303 which is engaged in opening and closing movements; thus, according to the closing motion of the air cylinder 303, aramid yarns being pulled downward (i.e., pulled in the -Y direction) by the air aspirator 308 are cut, and the cut part is aspirated and collected by the air aspirator 308 provided at the lower side.

The aramid yarns cut to a predetermined length are positioned in front of a trumpet-shaped aramid yarns shaper (not shown) by the optical cord grip hand 301. The aramid yarns shaper has a structure such that hot air is blown over the aramid yarns in front of the shaper; thus, after blowing the hot air for a predetermined time, aramid yarns are pushed against the aramid yarns shaper a plural number of times according to the forward and backward movements of the optical cord grip hand 31, so as to make the tuft of aramid yarns spread as do the petals of a flower.

The optical cord after shaping is again positioned at cutter 305 for polyamide and a cutter for optical fiber (not shown) in turn which are attached to the air cylinder 303 by the optical cord grip hand, so as to cut the polyamide and the optical fiber to predetermined lengths, and they are thereby cut. The optical cord pre-processed with respect to the predetermined lengths is then returned to a given position on the pallet by the optical cord grip hand 301. After returning, the optical cord grip hand 301 turns back to its home position for preparing for the pre-processing of the next optical cord.

The cutting lengths of each part such as the PVC Sheath, aramid yarns, polyamide, and optical fiber can be determined according to the relative distance between the optical cord grip hand and each cutter; thus, the cutting lengths which vary according to the kind of the optical connector can be determined with adjustment of the displacement of the optical cord grip hand based on the manufacture parameters as shown in FIGS. 28–31, which are transmitted from the system controller 1 via the first communication line 16.

§1-9-3. Cleaning module

The embodiment of the cleaning module 4 is shown in FIG. 8. In the figure, reference numeral 401 indicates an optical cord grip hand, reference numeral 402 indicates a cleaning part, reference numerals 403 indicate non-woven fabrics, and reference numerals 404 indicate air pads.

The pallet on which the pre-processed optical cord is installed is positioned at a predetermined area in front of the cleaning module by the above-explained method. At this time, the optical cord grip hand 401 moves from the side of the cleaning module 4 to above the pallet, grasps a predetermined part of the optical cord on the pallet, and positions it at the cleaning part 402. The cleaning part has a structure in that an optical fiber is inserted into the non-woven fabrics 403 facing with each other, and the air pads 404 pinch it from the both sides; therefore, by putting in and pulling out an optical fiber to and from this cleaning part by the optical cord grip hand 401, the primary coating attached to the surface of the fiber can be removed.

In addition, the cleaning part also has a heating mechanism (not shown) and an alcohol dripping mechanism (not shown); thus, not only primary coating made of silicone grease, but also that made of ultraviolet curing resin can be removed.

The optical cord, after the removal of the primary coating, is then returned to the given position on the pallet by the optical cord grip hand 401. After returning, the optical cord grip hand 401 turns back to its home position for preparing for the cleaning of the next optical cord.

§1-9-4. Insertion module

The embodiment of the inserting module 5 is shown in FIG. 9. In the figure, reference numeral 501 indicates an optical cord grip hand, reference numeral 502 indicates an adhesive-coated ribbon, reference numeral 503 indicates a ferrule grip unit, reference numeral 504 indicates a detector for the amount of protrusion, reference numeral 505 indicates a second optical cord grip hand, and reference numeral 506 indicates a caulking unit.

The pallet with the optical cord whose optical fiber was cleaned is positioned at a predetermined area in front of the insertion module 5 by the above-explained method. At this time, the optical cord grip hand 501 moves from the side of the insertion module 5 to above the pallet, grasps a predetermined part of the optical cord on the pallet, and positions it at the adhesive-coated ribbon 502 to previously coat the optical fiber with adhesive for the purpose of realizing high conformability between the optical fiber and the adhesive.

The optical fiber coated with the adhesive is then positioned at a ferrule previously filled with adhesive. After that, the optical cord grip hand 501 gradually starts to advance. At this time, the ferrule grip unit 503 also starts a forward and reverse rotational motion for realizing higher conformability between the optical fiber and the adhesive. When the optical fiber reaches the capillary part of the ferrule, the forward and reverse rotational motion of the ferrule grip unit 503 is stopped in order to avoid generation of a minute scratch caused by such forward and reverse rotational motion.

The advance motion of the optical cord grip hand 501 is continued afterwards; thus, the fiber head is gradually protruding from the top of the ferrule. This protruded optical fiber shuts out a ray output from the emission part 504a of the detector 504 for the amount of protrusion, which is provided in front of the front surface of the ferrule. This shutting action makes the signal level of light received by light receiving part 504b which faces the emission part 504a to be lowered. Therefore, the above-mentioned advance motion of the optical cord grip hand 501 is stopped when the signal level is lowered up to a predetermined level. The amount of protrusion also depends on polishing capability, which will be described later, and in this embodiment, the detector 504 for the amount of protrusion is adjusted for realizing a condition in which the amount of protrusion exists within 0.5 mm±0.1 mm.

In order to prevent possible movement of the optical cord inserted in the ferrule in the next step in which a crimp ring is grasped, the second optical cord grip hand 505 which is provided in front of the caulking unit 506 and can move in the vertical direction is lifted and grasps this optical cord. After that, the first optical cord grip hand 501 opens and releases the optical cord, and then goes backward so as to grasp a crimp ring which is installed at the parts-holder 1501 on the pallet. After the first optical grip hand 501 grasps the crimp ring, it proceeds again and installs the crimp ring at the caulking unit 506. The caulking unit installed with the crimp ring is fixed at an air cylinder which is engaged in opening and closing movements; thus, according the opening and closing motion of the air cylinder, the crimp ring is caulked at the stop ring, and aramid yarns positioned between the stop ring and the crimp ring are compressed and fixed at the ferrule.

The optical cord with the ferrule fixed is then inserted into the cylindrical hole provided at the curing device 1502 on the pallet (refer to FIG. 19A) by the first optical cord grip hand 501. After the optical cord grip hand 501 returns the ferrule at the curing device 1502, the optical cord grip hand 501 returns to its home position to prepare for the insertion of the next optical cord.

In addition, the optical cord grip hand of each module, which pulls in an optical cord from the pallet, or returns a processed optical cord to the pallet, has almost the same structure and functions as the above-mentioned grip hands (i.e., 301, 401, and 501) do; therefore, the further explanation in connection with the optical cord grip hand will be omitted in the following explanation relating to each module when the structure and functions thereof can be easily understood.

§1-9-5. Removal module

The embodiment of the removal module 13 is shown in FIG. 10.

The pallet on which the optical cord with the ferrule at its head is installed is positioned at a predetermined area in front of the removal module 13 by the above-mentioned method. The removal module 13 has a short distance transfer mechanism 7301 which can transport a pallet to the forward or backward direction (i.e., in the "Z" direction), and transports a pallet which has been damaged during processing between the required-length cutting module 2 and the insertion module 5 to removal station 7302, and stores it. The capability of the removal module 13 for storing pallets is determined in consideration of the yield and the ability of a system operator. In this embodiment, desirable effects may be obtained by setting the storage capability to be 2 or 3 (pieces).

The damaged pallet can be judged according to a signal of "removal possible" of terminal No. 26 of the second communication lines, as shown in FIG. 33. At each transfer of the pallets, the transfer mechanism controller 12-18 determines a pallet (or pallets) to be removed with reference to the module operation status table, the content of which is transmitted from the system controller 1. The method of generating a signal of "removed pallet", which is performed by the transfer module controller 12-18, is not a substantial item of the present invention, and may be a known method; thus, practical explanation for it will be omitted here.

The reason for providing the removal module between the insertion module and the curing module, which will be explained in the next section, is as follows.

That is, when the polyamide is cut in the pre-processing module, it is possible to generate a minute scratch on the surface of the optical fiber in the neighborhood of the cut position. If the optical fiber having such a scratch is fixed to a ferrule by the adhesive and is used for a long time under an atmosphere with a temperature variation, stress caused by the difference between the linear expansion coefficients of the metal fitting of the ferrule-flange and the optical fiber repeatedly acts on the minutely scratched part of the optical fiber, the part being located at the metal fitting. This may cause a breakage accident of the optical fiber. Such a breakage accident causes some problems such as (i) the whole operation is interrupted so as to remove the optical cord including the damaged optical fiber, and (ii) a defective product may be mixed with non-defective products.

Therefore, for preventing the breakage accident, it is necessary to examine any minute scratches on the surface of the optical fiber before the optical fiber is inserted and fixed to a ferrule. As an inspection method for the scratches of the optical fiber, a surface observation method using an optical microscope and a stress-testing method are known. An optical fiber bending method and an optical fiber tension method are known as stress-testing methods. In the present embodiment, the optical fiber tensile method is adopted as the inspection method for scratches in the optical fiber, and a tensile test is performed in the above-explained cleaning module 4.

That is, by pulling an optical fiber caught by the air pads by using the optical cord grip hand at the time of cleaning, presence/absence of scratches of the optical fiber is inspected. If a scratch by chance exists, the optical fiber would break at the scratched part according to this tensile test; thus, the breakage of the optical fiber can be detected by the insertion module in which the amount of protrusion of the optical fiber from the ferrule is examined when the optical fiber is inserted into the ferrule. The continuous assembling and inspections operations with respect to the optical cord with a broken optical fiber are useless; therefore, it is necessary to rapidly remove the pallet with the damaged optical cord from the transfer mechanism. The above is the reason for providing the removal module at the next stage of the insertion module.

517 1-9-6. Curing module

The embodiment of the circulating-type curing module 6 is shown in FIG. 10. In the figure, reference numeral 601 indicates an electric power supplying line, reference numeral 602 indicates a pallet operating mechanism, and reference numeral 603 indicates a pallet transport mechanism.

The pallet 15 on which the optical cord which was judged as an acceptable product in the existing processes is handed over to the pallet transport mechanism 603 by the pallet operating mechanism 603 of the removal module 13. Then, power is supplied to a part to be heated of the pallet which is transported with a speed of approximately 300 mm/min, via electric power supplying line 601 and power-receiving part 1503 (refer to FIG. 19A).

The heater provided on the pallet 15 comprises a semiconductor called a "positive thermistor" (PTC), and the temperature of the heater is kept at a specified level by the supplied power voltage. That is, after power is supplied, the temperature of the PTC increases to its critical temperature within approximately 1 minute. When the PTC has reached the critical temperature, self-resistance of the PTC abruptly increases, so that supplied current decreases and the increase of temperature is stopped. On the other hand, if the PTC temperature decreases to below the critical temperature for some reason, the self-resistance abruptly decreases, so that the supplied current increases and the temperature of the PTC again increases up to the critical temperature.

That is, in a process of transporting the pallet 15 in the curing module in a direction which is indicated by arrows shown in FIG. 10, the adhesive in the ferrule is thermally cured and the bonding strength between the ferrule and the optical fiber increases. The pallet 15 on which the thermally-cured optical fiber is installed is then transported to the end of the curing module, and returned to the transfer mechanism 12 again by the pallet operating mechanism 602.

Various other structures are possible for the curing module 6 in addition to the above-mentioned circulating type. For example, a structure comprising an X/Y orthogonal pallet transport mechanism and many racks for storing pallets may be considered, wherein the pallet is transported to an empty rack by the X/Y orthogonal pallet transport mechanism and is stored for a time (10~20 minutes) for curing the adhesive in the ferrule. Regardless of the structure of the mechanism, any curing module which has the following two functions may produce desirable effects in the present system.

(1) Storing the pallet for a time (10~20 minutes) for curing the adhesive in the ferrule.

(2) Supplying power to a pantograph-type power-receiver provided on the pallet so as to heat the heater.

§1-9-7. Polishing module

The embodiment of the polishing module 7 is shown in FIG. 11. In the figure, reference numeral 701 indicates a chuck mechanism, reference numeral 702 indicates a Z stage, reference numeral 703 indicates a constant-pressure pressing unit, reference numerals 704 (704-1, 704-2, 704-3) indicate polishers, reference numeral 705 indicates a spindle motor, reference numeral 706 indicates a pump for supplying rough-polishing liquid, reference numeral 707 indicates a pipe for dripping rough-polishing liquid, reference numeral 708 indicates a pump for supplying AdPC (Advanced Physical Contact) polishing liquid, and reference numeral 709 indicates a pipe for dripping AdPC polishing liquid.

The pallet on which the optical cord with the ferrule at its head is positioned at a predetermined area in front of the polishing module 7 by the aforementioned method. At this time, an optical cord grip hand (not shown) moves from the side of the polishing module 7 to above the pallet, grasps the ferrule, moves it in front of the Z stage 702 (i.e., the initial position), and installs the ferrule to the chuck mechanism 701. The optical cord grip hand has a V-groove-shaped structure which is engaged in opening and closing movements; thus, the optical cord grip hand can grip not only an optical cord but also a cylindrical ferrule with diameter of 1~5 mm.

On the Z stage, constant-pressure pressing unit 703 including the chuck mechanism 701 is provided. The constant-pressure pressing unit 703 presses the ferrule grasped by the chuck mechanism against polishers 704 (704-1, 704-2, 704-3). The polishers to which the ferrule is pushed is rotated by the spindle motor 705.

In this polishing module, removal of the adhesive is performed by fixed polisher (grinding stone) 704-1, and flexible polishers (704-2 and 704-3) are separately used for rough-polishing and AdPC polishing. Accordingly, the three polishing processes can be performed at a time with a slight movement of the ferrule. The ferrule from which the adhesive was removed is moved to rough-polishing area 704-2 by a X-stage (not shown) provided on the Z stage. By using a diamond abrasive supplied by the pipe 707 for dripping rough-polishing liquid, the top of the ferrule and the optical fiber bonded to the ferrule is polished to be a spherical surface of the diameter of approximately 20 mm.

This ferrule is again moved to AdPC polishing area 704-3 by the X stage. By using an $SiO_2$ abrasive supplied by the pipe 709 for dripping AdPC polishing liquid, a scratch by polishing or an affected layer by the process which was produced at the rough-polishing of the top of the ferrule and the optical fiber bonded to the ferrule is polished and removed, so that the top of the ferrule is AdPC-polished to a mirror-finish.

In this polishing machine, the optimal polishing pressure for each polishing process is given by the operation of the constant-pressure pressing unit 703; therefore, if any dimensional error in the longitudinal direction of the ferrule or any gripping error of the chuck mechanism 701 exists, such a deterioration relating to polishing characteristics, which may occur when using a constant-distance polishing method (in which the distance between the ferrule and the polisher is constantly maintained) which has been conventionally adopted in such a polishing machine, never occurs.

The polishing characteristics in the present embodiment satisfy the AdPC polishing specifications by which analog optical transmission is possible.

The ferrule which was AdPC-polished is returned to the initial position by the Z stage, and then inserted into the cylindrical hole provided at the curing device 1502 on the pallet (refer to FIG. 19A) by the optical cord grip hand. After the insertion, the optical cord grip hand returns to its home position and is prepared for the polishing of the next ferrule for the optical cord.

§1-9-8. Polished surface inspection module

The embodiment of the polished surface inspection module 8 is shown in FIG. 12. In the figure, reference numeral 801 indicates a ferrule rotating mechanism, reference numeral 802 indicates a V-groove-shaped chuck mechanism, reference numeral 803 indicates a first light source, reference numeral 804 indicates a cylindrical ferrule holder, reference numeral 805 indicates a two-beam interference lens, reference numeral 806 indicates a CCD, reference numeral 807 indicates a lens-exchanging mechanism, reference numeral 808 indicates a lens for measuring scratches on the end face of the ferrule, reference numeral 809 indicates a lens for measuring the amount of eccentricity, reference numeral 810 indicates a second light source, and reference numeral 8010 indicates a ferrule-inclining mechanism.

The pallet on which the optical cord with the AdPC-polished ferrule is held is positioned at an predetermined area in front of the polished surface inspection module 8. At this time, a first optical cord grip hand (not shown) moves from the side of the polished surface inspection module 8 to above the pallet, grasps a predetermined part of the optical cord on the pallet, and inserts it into the V-groove-shaped chuck mechanism 802 provided in the polished surface inspection module. At the same time, a second optical cord grip hand (not shown) positioned at spacing L with the position of the first optical cord grip hand moves to above the pallet, grasps a predetermined part of the optical cord on the pallet, and inserts it into the hollow part of the cylindrical ferrule holder 804 provided in the polished surface inspection module in order to easily perform detection of the center position of the fiber by using an image-processing method.

It is desirable for the polished surface inspection module which can function well in the present invention, to have functions of measuring (i) the radius of curvature of the end face of the polished ferrule, (ii) the vertex eccentricity, that is, the deflection between the center position of the fiber and the vertex of the polished surface, (iii) the amount of fiber withdrawal (or protrusion) from the end point of the polished ferrule, and (iv) the flows on the end face.

In the inspection module used in this embodiment, a two-beam interference optical system using the first and second light sources 803 and 810 is adopted, and the contour of the polished surface, such as the radius of curvature and the vertex eccentricity, is measured by analyzing the image containing an interference fringe. The measurement of the amount of fiber withdrawal (or protrusion) is performed under conditions in which the ferrule is slightly inclined with respect to the optical axis by the ferrule-inclining mechanism 8010 in order to generate an interference fringe at the center of a light beam. In addition, the scratches on the end face of the ferrule are measured by the lens 808 for measuring scratches on the end face.

Detection ranges of the polished surface inspection module 8, whereby desirable effects can be obtained in the present embodiment, are 10~25 mm for the radius of curvature, 0~50 $\mu$m for the vertex eccentricity, and −0.05~+0.1 $\mu$m for the amount of fiber withdrawal/protrusion. Additionally, detection resolution of the polished surface inspection module 8, whereby desirable effects can be obtained in the present embodiment, is approximately 1/10 of the detection range for each item to be detected. The image analyzing method for measuring the contour of a polished surface within a specified accuracy according to an interference fringe is a known technique, and an image analyzing device presently on the market can yield desirable results in the present embodiment; therefore, further explanation will be omitted here.

The control of the lens-exchanging mechanism 807 is performed by module controller 8-18 for the polished surface inspection module. The inspection result data obtained by the polished surface inspection module 8 are stored in a file storage unit in an image analysis and storage unit mounted in this module, with lot-number data as shown in FIGS. 28~31, which are transmitted from system controller 1 via the first communication line. Here, there is no quantitative specification for scratches on the end face as one of detection data; thus, it is desirable that only image data be stored without quantitative measurement and if necessary, the image may be reproduced on a monitoring display for performing visual inspection.

The optical cord with the ferrule whose polished-surface contour has already been inspected is inserted into a predetermined cylindrical hollow of curing device 1502 on the pallet (refer to FIG. 19B) by the first and second optical cord grip hands in a manner such that the direction of eccentricity becomes upward. After the insertion, the optical cord grip hands return to their home positions so as to prepare for the inspection of the next ferrule of the optical cord.

The optical cord, one end of which has already been inspected and which has been transferred by spacing L of the parts-holders by the transfer mechanism, must be offered for another inspection for the other end face thereof. Therefore, a third optical grip hand (not shown) moves from the polished surface inspection module 8 to above the pallet, grasps a predetermined part of the ferrule which has already been inspected, and inserts it into a hollow part of a second cylindrical ferrule holder (not shown) provided in the polished surface inspection module in order to easily detect the center position of the fiber. At the same time, the first optical cord grip hand moves from the polished surface inspection module 8 to above the pallet, grasps a predetermined part of the pre-inspected ferrule, and inserts it into the V-groove-shaped chuck mechanism 802 provided in the polished surface inspection module. Further operations of this module are similar to those relating to the first ferrule inspection; thus, explanation thereof will be omitted here.

§1-9-9. Final Assembling module The embodiment of the final assembling module 9 is shown in FIG. 13. In the figure, reference numeral 902 indicates a ferrule fixing unit, reference numeral 903 indicates a white light source, reference numeral 904 indicates a ferrule holder, reference numeral 905 indicates an eccentricity-direction detection unit, reference numeral 906 indicates a plug frame insertion unit, reference numeral 907 indicates a coupling insertion unit, reference numeral 908 indicates a stage, reference numeral 909 indicates a parts-transporting hand, reference numeral 910 indicates a parts-feeder for plug frames, and reference numeral 911 indicates a parts-feeder for couplings.

The final assembling module detects the direction of eccentricity of the ferrule, the estimate for which has been completed in the polished surface inspection module, and performs a final assembling process by inserting a specified plug frame and coupling according to this direction.

The pallet, on which the optical cord whose inspection of polished surface contour has been completed is installed, is positioned at a predetermined area in front of the final assembling module 9 by the above-explained method. At this time, a first optical cord grip hand moves from the side of the final-assembling module 9 to above the pallet, grasps a predetermined part of the ferrule on the pallet, and inserts it into the ferrule fixing unit 902 provided in the final-assembling module 9. At the same time, a second optical cord grip hand positioned at spacing L with respect to the first optical cord grip hand moves to above the pallet, grasps a predetermined part of the optical cord on the pallet, and inserts it into the ferrule holder 904 provided in the final assembling module 9 in order to easily detect the center position of the fiber.

The ferrule mounted at the ferrule fixing unit 902 is positioned at the eccentricity-direction detection unit 905 for performing eccentricity measurement, and amounts of eccentricity at four notches provided at a flange of the ferrule are measured and compared while rotating the ferrule by every 90 degrees. The notch of the flange corresponding to the largest eccentricity is then oriented to a predetermined direction (for example, in the +Z direction). In the plug frame insertion unit 906 and the coupling insertion unit 907, a plug frame and a coupling are previously supplied with specified angles by an actuator. The stage 908 on which these units are disposed is moved and positioned at the ferrule whose eccentricity direction has been adjusted, and then ferrule fixing unit 902 is advanced so as to perform the insertion and final assembly. After completing the assembly for one end, the pallet is moved and the final assembling of the other end is performed according to a similar process.

In the present embodiment, the supply of plug frames to the plug frame insertion unit 906 and the supply of couplings to the coupling insertion unit 907 are performed by parts-transporting hand 909. That is, a plug frame which is arranged in a specified direction by the parts-feeder 910 is picked up by the parts-transporting hand 909, and then transported and positioned at a predetermined part of the plug frame insertion unit 906. On the other hand, a coupling is also arranged by the parts-feeder 911 according to a similar process to that of the plug frame, and transported and positioned at the plug frame insertion unit 907 by the parts-transporting hand 909.

The optical cord assembled with the optical connector is then inserted to adaptor 1508 on the pallet (refer to FIG. 19A) by the first optical cord grip hand. As this adaptor, that is, as an optical cord grip unit, an adaptor-form structure is employed for easily performing insertion or extraction of an optical connector on the pallet.

§1-9-10. Optical performance evaluation module

The embodiment of the optical performance evaluation module 10 is shown in FIG. 14A. In the figure, reference numeral 1001 indicates a first optical cord grip hand, reference numeral 1002 indicates a second optical cord grip hand, reference numeral 1003 indicates a first optical connector-adaptor for a power meter, reference numeral 1004 indicates a first optical connector-adaptor for an LD light source, reference numeral 1005 indicates a second optical connector-adaptor for an LD light source, reference numeral 1006 indicates a second optical connector-adaptor for a power meter, and reference numerals 1007 indicate insertion plates.

The pallet on which the optical cord assembled with optical connectors is installed is positioned at a predetermined area in front of the optical performance evaluation module 10 by the above-explained method. At this time, the first and second optical cord grip hands 1001 and 1002 move from the side of the optical performance evaluation module 10 to above the pallet, grasp predetermined parts of optical connectors 4000 and 4010 on the pallet, move to the first optical connector-adaptor 1003 for the power meter and to the first optical connector-adaptor 1004 for the LD light source at high speed, and provisionally insert the optical connectors to each connector-adaptor. After that, the connectors are completely inserted into the adapters by using insertion plates 1007 shown in FIG. 14B, and in this situation, the connection characteristics of one optical connector are measured.

The measurement system (not shown) consists of an LD source, a coupler for optical fibers, an optical cord with a master connector, and a power meter having a light receiving part including an index matching plate and a light receiving part having a wide detection range. In consideration of reproducibility and reliability of the measurement, a conventional termination method using a matching oil was not adopted, but the index matching plate provided in the optical connector-adaptor for the power meter is used for termination.

The optical connectors whose first measurement has been completed are pulled out from the adapters 1003 and 1004 by the first and second optical cord grip hands 1001 and 1002 so as to measure the connection characteristic of the other optical connector, and are inserted into the second optical connector-adopter 1005 for LD light source and the second optical connector-adaptor 1006 for power meter, respectively.

The optical connectors, both of whose connection characteristics were measured, are then inserted into the optical connector grip units on the pallet by the first and second optical cord grip hands 1001 and 1002.

Additionally, in order to obtain desirable results in the present embodiment, the detection range of return loss is specified to be 50dB, reliability is ±1 dB, and repeating reproducibility of the return loss is 0.05 dB or less. For the measurement technique of this module, any known method may be used; thus, practical explanations for the structure and method of the measurement system will be omitted. Reading of measurement data from the optical measurement device and synchronous operations of the first and second optical cord grip hands and the optical measurement device are controlled and performed by a measurement device control and storage unit provided in this module. Furthermore, inspection result data obtained by this optical performance evaluation module 10 are stored in a file storage unit in the measurement device control and storage unit provided in this module, with lot-number data, as shown in FIGS. 28~31, which are transmitted by system controller 1 via the first communication line, so as to be used as manufacturing management data.

§1-9-11. Stamping module

The embodiment of the stamping module 11 is shown in FIG. 15. In the figure, reference numeral 1301 indicates a set of mother die print toothed wheels, reference numeral 1302 indicates a thermal transfer ribbon (referred to as "ribbon" hereinafter), reference numeral 1303 indicates an electro-thermal heater, reference numeral 1304 indicates an optical cord fixing stand, reference numeral 1305 indicates a ribbon holder, reference numeral 1306 indicates a ribbon winder, reference numeral 1307 indicates a lifting guide for mother die print toothed wheels, and reference numeral 1308 indicates an optical cord.

The optical cord 1308 on which a lot number will be printed is fixed at optical cord fixing stand 1304 by an optical cord grip hand (not shown) from pallet 15 which was positioned at the stamping module. If a lot number which has been transmitted from the system controller and a lot number stored in the stamping module agree by comparison, the minimum digit of the increment unit of the mother die print toothed wheels is stepped (according to an incremental method, but a stepping mechanism is not shown here). This set of mother die print toothed wheels consists of a number of mother die print toothed wheels, the number being equal with a predetermined digit number, and numerals from 0 to 9 are engraved in convex form over the entire circuit of each mother die toothed wheel.

When the set of mother die toothed wheels descends to the side of optical cord 1308 according to guidance by the lifting guide 1307, the ribbon 1302 put between the optical cord and the set of mother die toothed wheels firmly contacts the surface of the optical cord, and pigment coated on the surface of the ribbon is thermally transferred to the optical cord side according to figures corresponding to a lot number of the mother die teeth which contact the optical cord via the ribbon and which have been heated by electrothermal heater 1303. In this way, the figures corresponding to the lot number become visible.

In this embodiment, the stamping module having a print mechanism using the mother die tooth method has been explained in consideration of cost reduction with respect to a print mechanism; however, it is of course the case that if a printing method other than the above method, such as an inkjet method or a laser method, is used, the present invention can still function effectively. On the other hand, the embodiment using the incremental method which has a simple setting mechanism has been explained as a method for setting mother die teeth; however, it is of course the case that when providing a setting mechanism for each mother die toothed wheel so as to set a random lot number, this invention can also effectively function, although the setting mechanism becomes rather complicated.

§1-9-12. Elevating module

The embodiment of the elevating module 14-1 is shown in FIG. 18. In the figure, reference numeral 1401 indicates a pallet receiving table, reference numerals 1402 (1402-1 and 1402-2) indicate an upward/downward transfer mechanism, reference numeral 1403 indicates a transfer belt-mechanism, and reference numeral 1404 indicates a pallet transfer mechanism.

The optical cord printed with a lot number in the stamping module is manually removed from the pallet and is handed over to an appearance-inspecting process by visual inspection, and is then sent to a packing process. On the other hand, the pallet from which the optical cord was removed and which was transferred to the end point of the processing line by the transfer mechanism 12 is positioned at the pallet receiving table 1401 by the pallet transfer mechanism 1404. The pallet which was positioned at the pallet receiving table is lowered by the upward/downward transfer mechanism 1402 up to a point at which the bottom surface of the pallet contacts the transfer belt-mechanism 1403. The pallet which has contacted with transfer belt-mechanism 1403 is transferred by the friction between the belt and the bottom surface of the pallet to the left in the plane of the paper of FIG. 18, and transported to a pallet return mechanism mounted on the base of the transfer mechanism 12.

In the addition, elevating module 14-2 has a mechanism for raising a pallet so as to perform an opposite operation with respect to the above operation, and has a function of re-forwarding a pallet to the pallet transfer mechanism repeatedly.

§2. Second Embodiment

Figure 21:
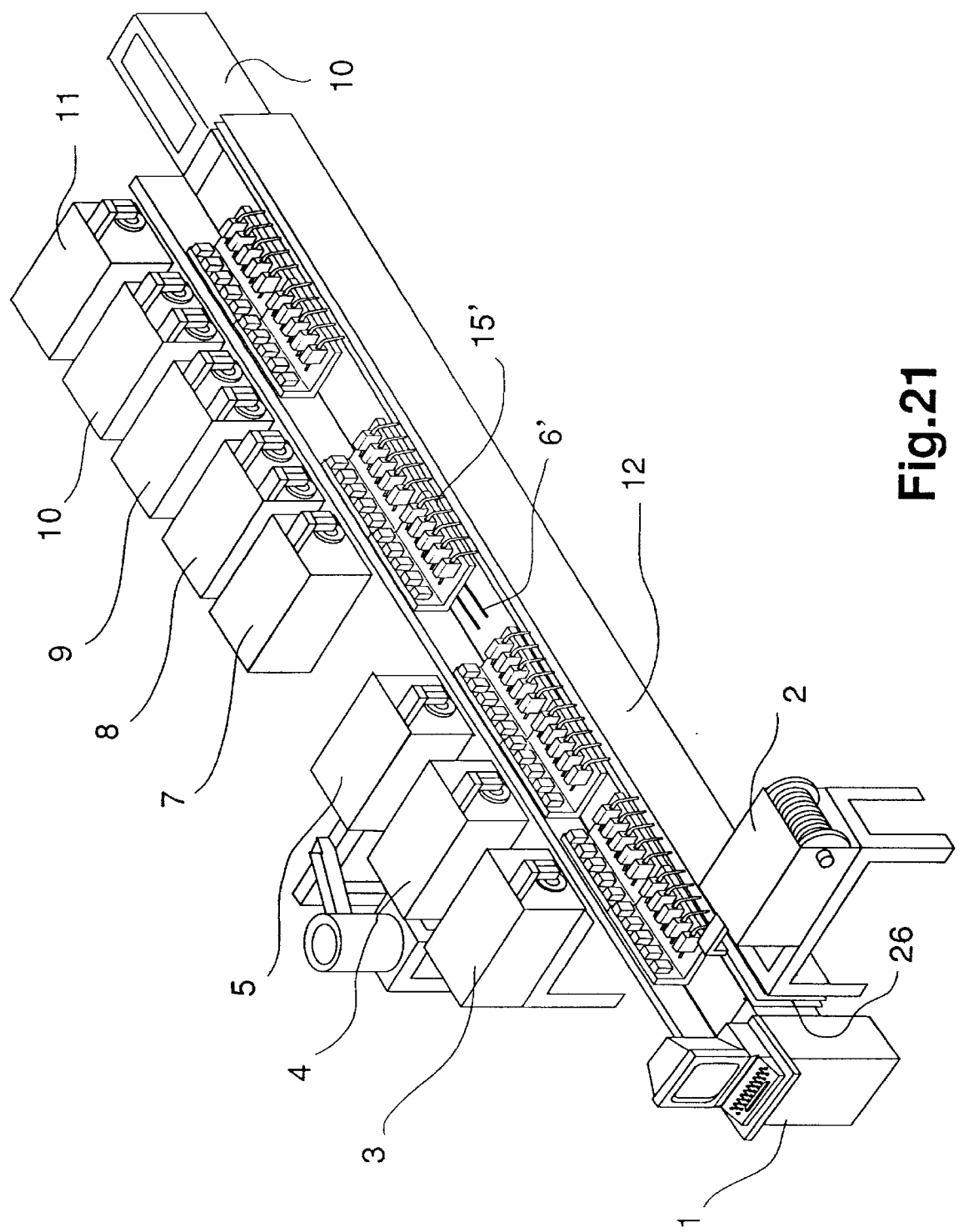
FIG. 21 is a perspective view of the system of the second embodiment, which uses pallets as shown in FIG. 20.

FIG. 21 shows an arrangement of the second embodiment of the automatic assembly and inspection system for optical connectors according to the present invention, for realizing simultaneous assembly of plural optical connectors by simultaneously transferring plural optical cords. In this embodiment, a pallet having a form for mounting plural optical cords is used. The structure of such a pallet will be explained below.

§2-1. Configuration of the pallet of the second embodiment

Figure 20:
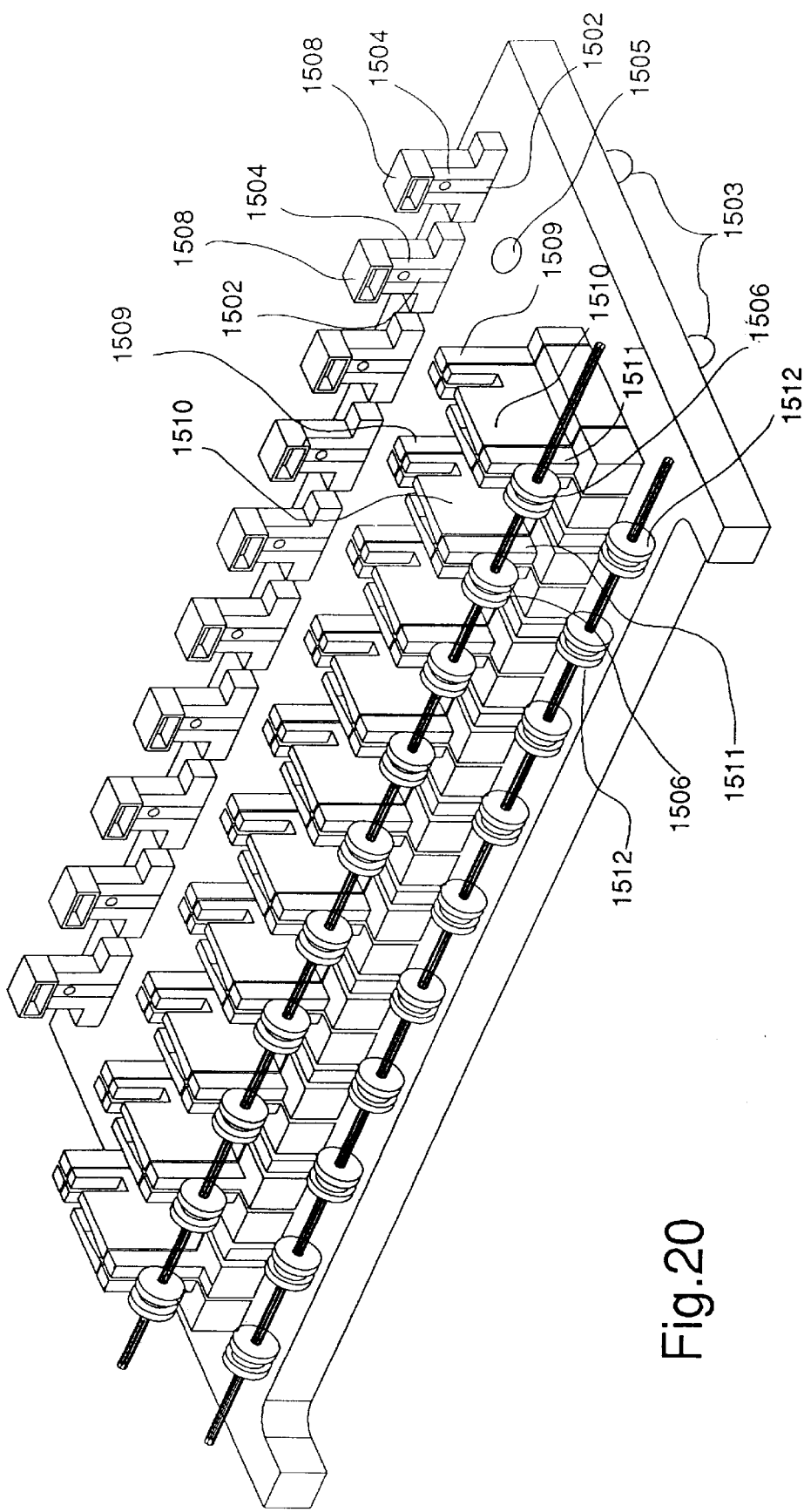
FIG. 20 is a perspective view of an example of the pallet on which plural optical cords can be mounted, according to the present invention.

FIG. 20 shows the second embodiment of the pallet, and reference numerals 1506 indicate idler pulleys, reference numerals 1509 indicate crimp ring holders, reference numerals 1510 indicate boot holders, reference numerals 1511 indicate cord clamps, and reference numeral 1512 indicate guide pulleys.

The pitch of parts-holders, each of which including crimp ring holder 1509, boot holder 1510, and cord clamp 1511, is approximately ⅕ of that shown in the case of transferring one optical cord in the first embodiment.

Mounting operations of parts of the optical connector and optical cords to this pallet are performed in required-length cutting module 2 shown in FIG. 6. Specifically, a tapered pin provided in the elevating module is inserted from the lower side into a division hole (i.e., a hole for division) provided in boot holder 1510, and the boot holder 1510 are divided into two parts and opened to both sides in the X-direction. In this "open" state, a measure of the open part of the boot holder is larger than the outer diameter of a boot; thus, a boot can be easily mounted to the boot holder by the robot of required-length cutting module 2. Similarly to the boot, a crimp ring is mounted to crimp ring holder 1509 by the robot of required-length cutting module 2. Additionally, the head of an optical cord cut to a required length is grasped by the robot of required-length cutting module 2, and inserted into cord clamp 1511 which was divided and opened to both sides by the tapered pin. When the tapered pin moves downward after the insertion, the cord clamp 1511 closes and the optical cord is clamped to the pallet.

After the robot is returned to its home position, a drive pulley (not shown) moves on the idler pulley 1506, and the optical cord is made through the boot and the crimp ring, as in the case of threading a needle, by using a friction drive.

Additionally, after the optical cord is inserted into a ferrule in the insertion module 5, the crimp ring mounted in the required length cutting module 2 is pulled out from the crimp ring holder 1509 and positioned at the caulking unit in the insertion module by the optical cord grip hand. That is, a tapered pin which is provided in the transfer mechanism and which can move in the vertical direction is inserted into a division hole of the crimp ring holder, and the holder is divided and opened to both sides in the X-direction. After that, the crimp ring is pulled out from the pallet by the optical cord grip hand.

On the other hand, the assembly of optical connectors to optical cords and inspection thereof is performed by using the modules which were explained in the first embodiment, in which the pitch (spacing) of the cord is approximately 250 mm; therefore, each optical cord is mounted on the pallet of the second embodiment in a "U" shape with a pitch of 5 pitches of the parts-holders on this pallet.

§2-2. System configuration

The configuration of the system of the second embodiment will be explained with reference to FIG. 21.

In this embodiment, according to a pallet corresponding to high-density mounting, the curing module is buried as a curing line 6' in the transfer module 12. Additionally, in return for simultaneously transferring plural optical cords, it is unavoidable that substandard products are also continuously transferred. Accordingly, removal module 13 and curing module 6, which were included in the configuration of the first embodiment as shown in FIG. 1, have been omitted here.

Arrangement boards 26 disposed in front of the transfer mechanism consist of plural boards arranged in parallel, and a central slacking and extra part of each optical cord is kept in each space between any two of the parallel boards. That is, the arrangement boards are provided in order to avoid a situation in which five optical cords installed on the pallet shown in FIG. 20 become entangled during the transfer. As a structure for the arrangement boards, it is of course the case that any of a board type, a net type, or a parallel-lined type can yield desirable effects. The transfer method of the pallet and the processing method of each module when a pallet is positioned at the module are similar to those of the first embodiment; therefore, detailed explanation for each operation will be omitted here.

In this embodiment, according to the high density installation of optical cords, a length necessary for the curing line can be shortened; thus, it becomes possible to integrate the curing module into the transfer mechanism. Therefore, an area necessary for installing the system and the system cost can be reduced.

§3. Third Embodiment

Figure 22:
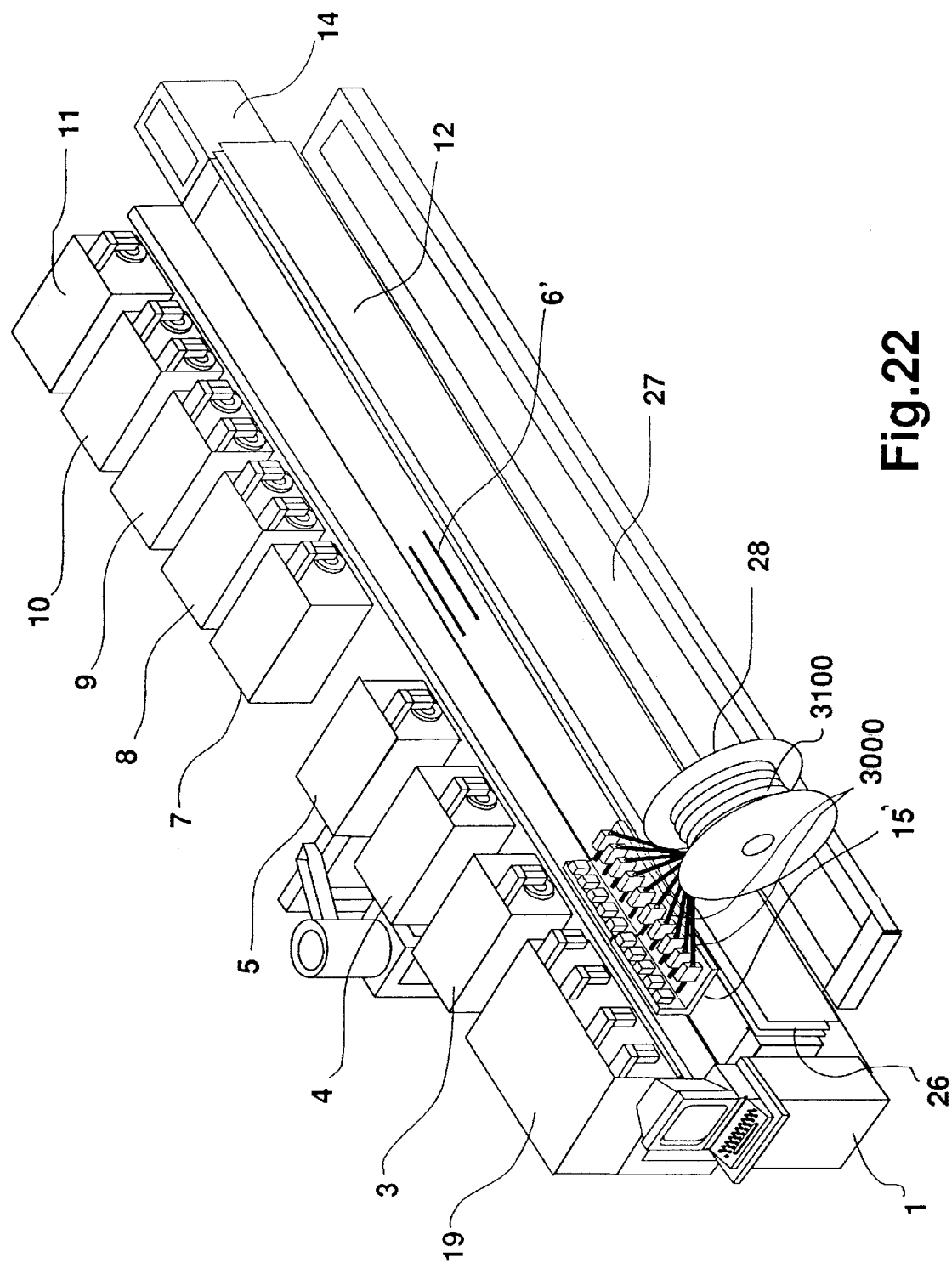
FIG. 22 is a perspective view of the system of the third embodiment, which uses pallets as shown in FIG. 20.

FIG. 22 shows the configuration of the third embodiment of the system according to the present invention, using a pallet as shown in FIG. 20, in a manner similar to that in the second embodiment.

In the figure, reference numeral 27 indicates an accompaniment line, reference numeral 28 indicates an optical cable drum, and reference numeral 19 indicates a parts-mounting module.

The parts-mounting module 19 has a structure of required-length cutting module 2 (explained with reference to FIG. 6) except for required-length cutter 202, and the method for mounting the parts of the optical connector to the pallet by using a robot is the same as that of the required-length cutting module; thus, further explanation thereof will be omitted here.

The PVC Sheath of optical cable 3100 including plural optical cords is manually slit, and ten optical cords 3000 taken from the PVC Sheath of the optical cable are respectively mounted to a pallet of the type shown in FIG. 20, on which crimp rings and boots were previously mounted by the part-mounting module 19.

Except for an operation of transferring the optical cable drum 28 synchronously with the transfer of the pallet by using the accompaniment line 27, the transfer method of the pallet and the processing method of each module when a pallet is positioned at the module are similar to those of the first embodiment; therefore, detailed explanation for each operation will be omitted here. Additionally, a transfer-control method for the accompaniment line 27 which transfers the optical cable in synchrony with the transfer of the pallet is known; thus, detailed explanation thereof will be omitted.

In this embodiment, not only the assembly of optical connectors to optical cords but also the transfer of an optical cable (or cord) drum may be performed according to the establishment of an accompaniment line and the synchronous operation thereof; thus, a limit of the length of the optical cord with which optical connectors are automatically assembled may be freely increased in practice.

§4. Fourth Embodiment

Figure 23:
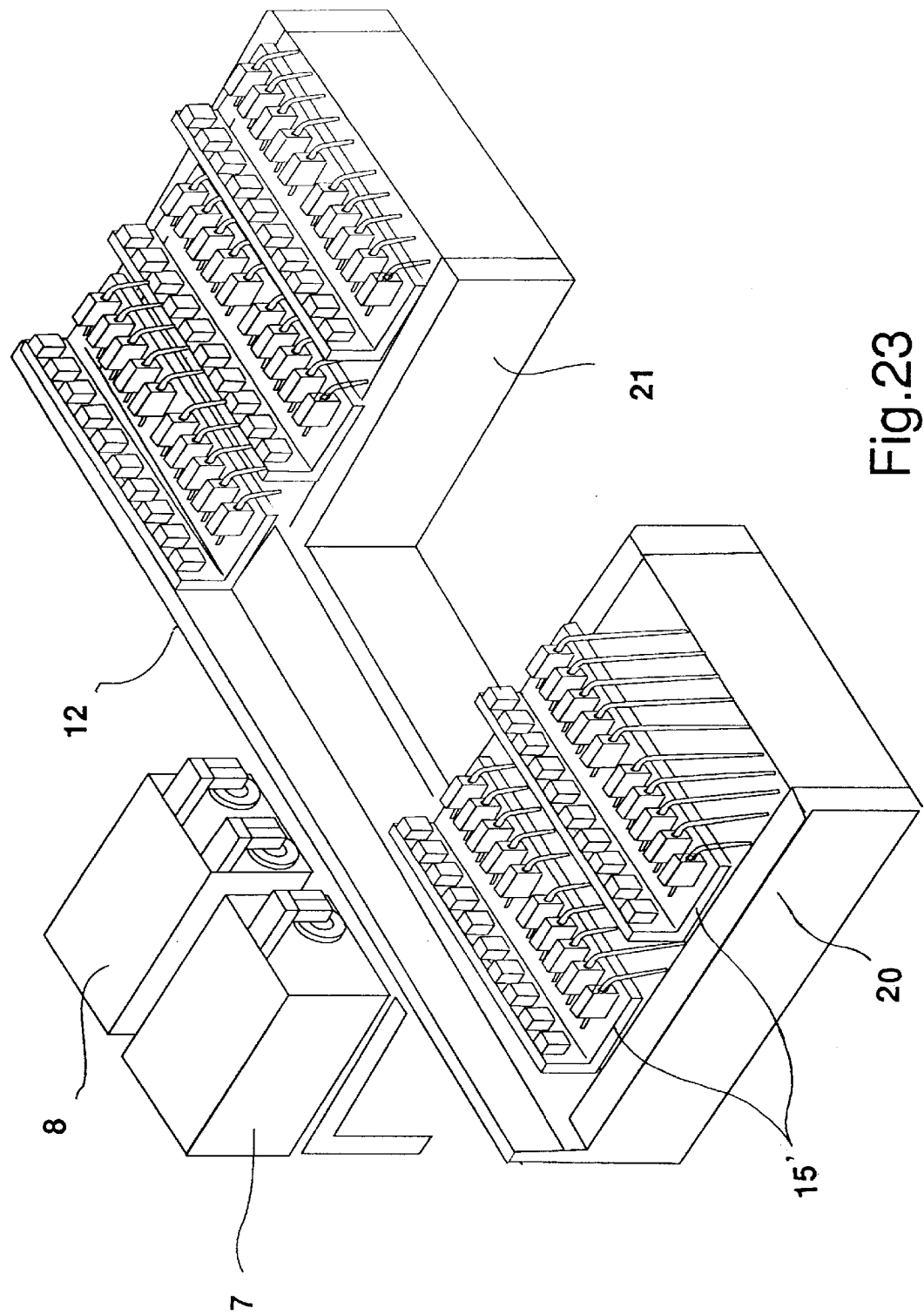
FIG. 23 is a perspective view of the system of the fourth embodiment, which uses pallets as shown in FIG. 20.

FIG. 23 shows the configuration of the fourth embodiment of the system according to the present invention, using a pallet as shown in FIG. 20, in a manner similar to that in the second embodiment.

In the figure, reference numeral 12 indicates a transfer mechanism, reference numeral 20 indicates an entry station, and reference numeral 21 indicates an exit station.

In this embodiment, an example of the partially automated structure will be explained, in which polishing module 7 and polished surface inspection module 8 are combined with the transfer module 12.

In the entry station 20, plural pallets 15' are provided, and the station 20 supplies each pallet to the transfer mechanism by using a belt transport mechanism. Each optical connector installed on the pallet is polished to be a convex hemispherical surface by the polishing module 7, and the contour of the polished surface is examined by the polished surface inspection module 8. Optical cords which were judged as acceptable products based on results of the inspection are returned to the pallet, while if any optical cords judged to be substandard are found, an alarm lamp is lit and the processing is discontinued so as to transfer the further processing of the substandard product to human hands. The pallet with the optical cords, all of which have been finished with respect to the assembly and inspection procedure, is then ejected into the exit station 21.

The above-explained consecutive processes are performed for each of the pallets in the entry station, and continued until all the pallets are ejected into the exit station. At a time in which demand for optical connectors is still not fully mature, the partially automated system as explained above is effective for partially automating processes which require particularly precise work or skilled work in manual assembly processing, so as to realize a highly-effective and cost-reductive assembly and inspection system for optical connectors. Additionally, when demand for optical connectors has matured, it is possible to construct a fully automated system by adding the other modules to the partially automated system whose use is thereby expanded; thus, system construction can be performed flexibly and economically.

As explained in the second to fourth embodiments, the following effects can be obtained by using a pallet as shown in FIG. 20, which can simultaneously transfer plural optical cords.

(1) The length necessary for the curing line can be shortened by the high-density mounting of optical cords; thus, it is possible to integrate the curing module into the transfer mechanism, whereby the area necessary for constructing the system and the system cost can be reduced.

(2) The present system can be applied to the assembly and inspection of optical connectors for an optical cable in which plural optical cords are contained together; thus, the optical cable with optical connectors can be economically manufactured.

(3) The transfer mechanism may be used in common for both a partially automated system and a fully automated system; therefore, proceeding to the fully automated system can be conducted under economically advantageous circumstances.

§5 Remote control

Hereinafter, an embodiment including communication with a remote terminal will be explained.

Figure 26:
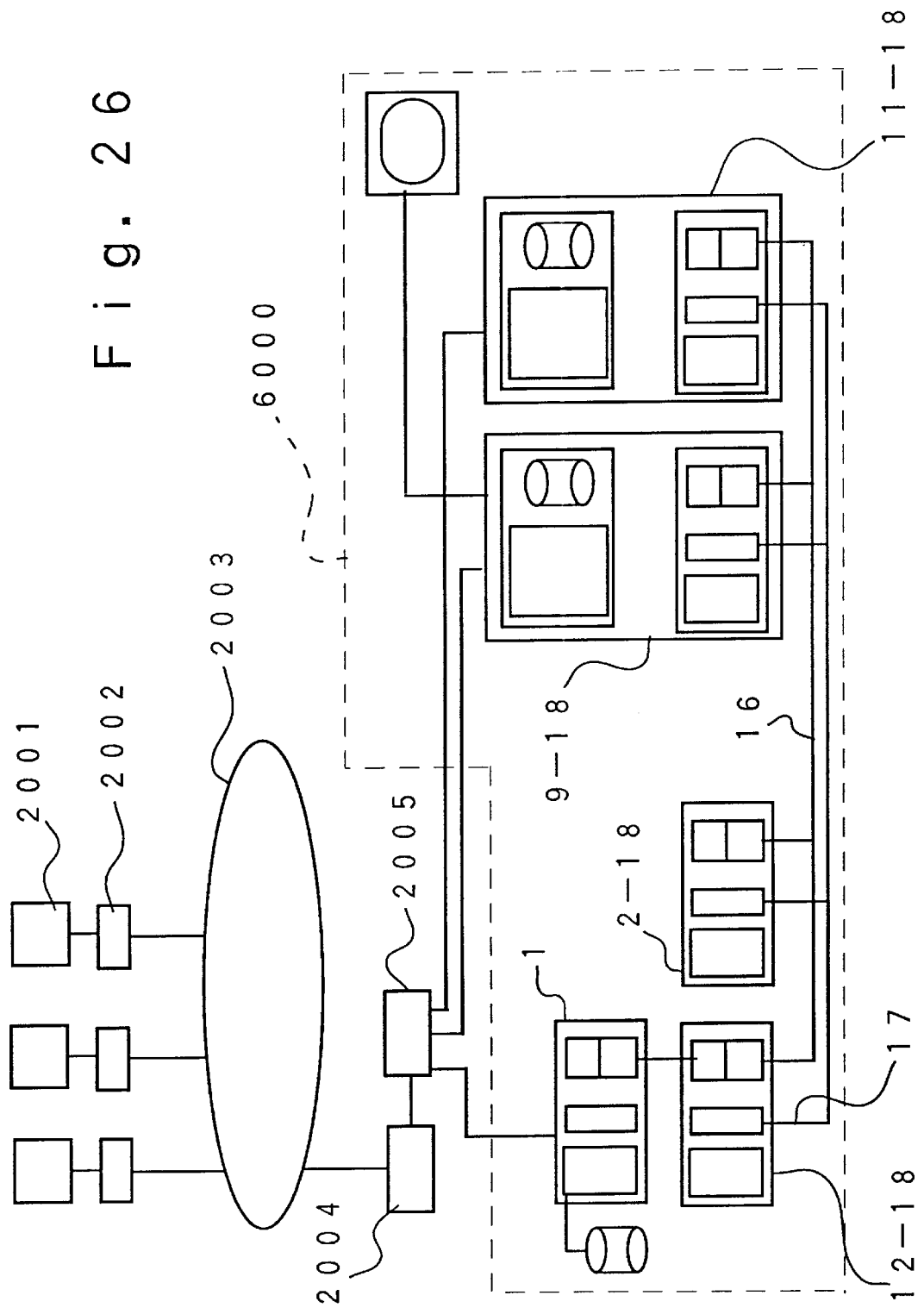
FIG. 26 is a block diagram of an embodiment of the system performing remote maintenance.
Figure 27:
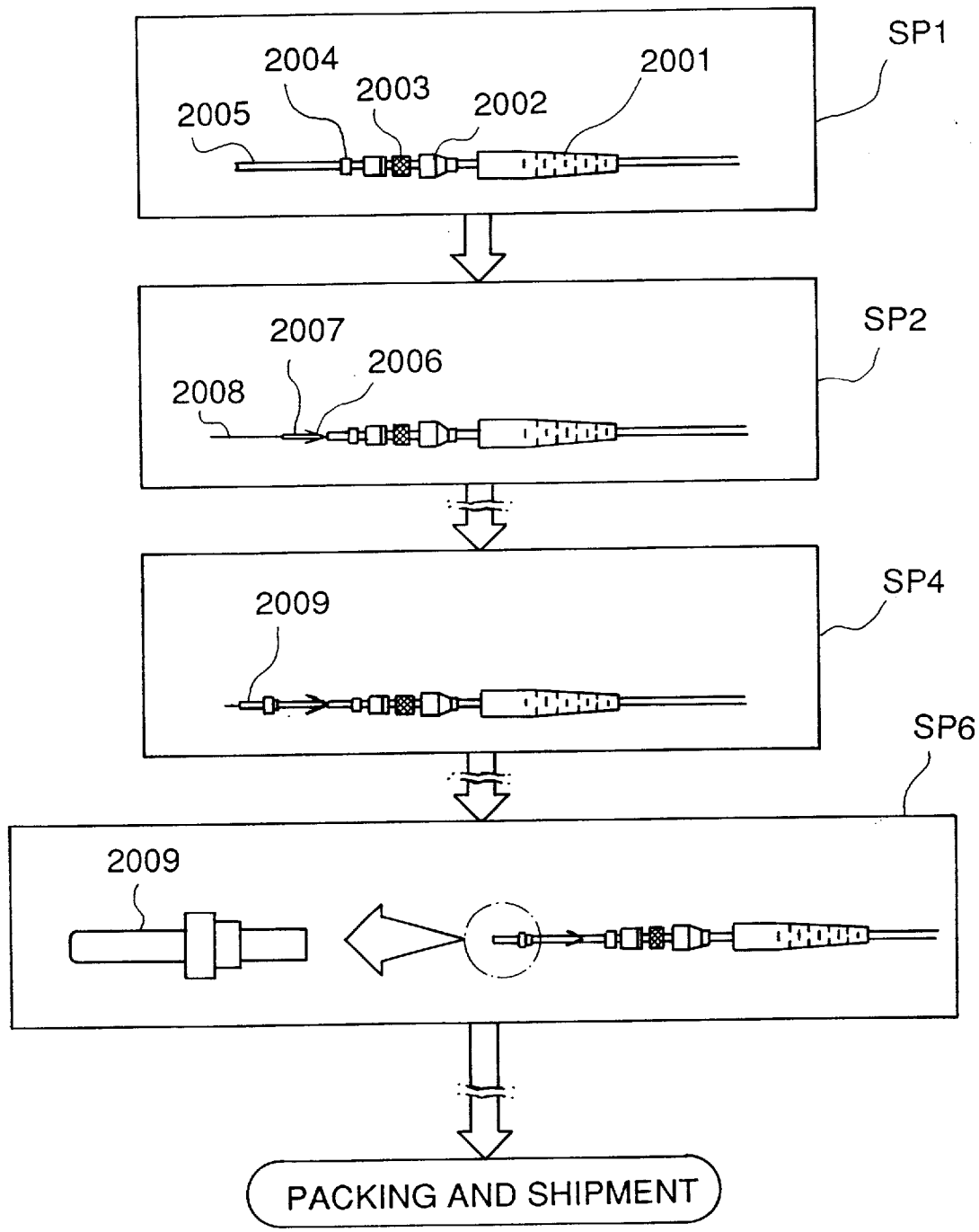
FIG. 27 schematically illustrates the processes necessary for the assembly of optical connectors.

FIG. 26 shows an embodiment of the system performing remote control, and reference numeral 2001 indicates a remote terminal, reference numeral 2002 indicates a first modem, reference numeral 2003 indicates a public network, reference numeral 2004 indicates a second modem, and reference numeral 2005 indicates an HUB.

The remote terminal 2001 is connected to the public network 2003 via the first modem 2004. The optical connector assembly and inspection system 6000 is also connected to HUB 2005 via the second modem 2004. In addition, LAN boards for (i) the system controller, (ii) the image analysis and storage unit of the polished surface inspection module, and (iii) the measurement device control and storage unit of the optical performance evaluation module are connected in a pier-to-pier relationship. That is, for a module having any automatic calculation unit, the unit and the system controller are connected using a LAN.

In this way, a maintenance person at the factory site can read out permitted inspection data, which are stored in the file storage units of the image analysis and storage unit of the polished surface inspection module and the measurement device control and storage unit of the optical performance evaluation module, from the terminal of system controller 1. Here, the permitted inspection data correspond to files used in common in the LAN, and a maintenance person can access such files. Additionally, these commonly-used inspection data can also be read out from the remote terminal via the public network 2003.

Furthermore, such "permission" setting is also given to a manufacture parameter file stored in the file storage unit of the system controller and a program file of each module controller so as to enable the remote terminal to read or write these files. That is, this remote control system has a structure in which not only reading of the manufacture parameters or the program for each controller (i.e., the control program) but also the writing of them can be performed by the remote terminal.

On the other hand, the system controller is connected to each module controller via the first communication line 16, as described above, and status information about each module input into the first communication line is stored in a status information file allocated to the file storage unit in the system controller. Therefore, the status information data of each module can be accessed from remote terminal 2001.

The main function of the remote terminal is remote maintenance; the main operations of which are to update programs for each module controller and to recover from damage to any damaged module. The procedure for updating the program for each module controller on the remote terminal side is as follows.

(1) Update of the program for each module controller

When a function is added to a control program for any module controller, or if a bug is found to be corrected in a part of a control program, the control program of the relevant module must be updated.

In this embodiment, an updated program for the controller is transmitted via the public network from the remote terminal (a remote terminal disposed at a factory site where the relevant module was mainly designed and manufactured) and input into a controller-program file in the file storage unit of the system controller in a factory where the optical connector assembly and inspection system is established. When system maintenance is performed, this transmitted new program file is transmitted via the first communication line 16 to the relevant module according to an operation of a maintenance person. That is, in this method for updating the program, it is possible to transmit a relevant program from one central section to each module controller of all the relevant modules simultaneously and uniformly. Therefore, in comparison with a method of carrying a medium containing a new program to a factory site so as to directly update the program of each relevant module, the version of the program can be easily managed and centrally-controlled management of maintenance can be realized. Additionally, the reason for indirectly performing the updating of the program for the module controller via a maintenance person is that in this kind of system, the authority to determine a change of the program is entrusted to a maintenance person.

(2) Remote maintenance

As explained above, any module which was damaged during the assembling and inspecting processes of the optical connector informs the transfer mechanism controller of its anomalous condition by not transmitting a "transfer completion signal" via the second communication lines to the transfer mechanism controller. The transfer mechanism controller which recognizes the anomalous condition transmits an interruption signal to the system controller 1 so as to discontinue the assembly and inspection processing and to request a maintenance treatment. The system controller 1 informs a maintenance person of the generation of an anomalous condition by flashing a red lamp, ringing a buzzer, or the like.

The maintenance person who recognizes the anomalous condition reads out status information from the module controller of the damaged module via the first communication line and inputs the information data into an area for the status information file allocated to the file storage unit in the system controller by operating the terminal of system controller 1, so as to start an analysis of a damaged part according to the input status information. The damaged part is clearly indicated according to such an anomalous analysis, and with respect to any damage which has been judged to be reparable in the factory site, work for recovery is immediately started by the maintenance person.

On the other hand, with respect to complicated damage whose relevant damaged part could not be specified by the above first-stage anomalous analysis, a second-stage anomalous analysis is performed at a remote maintenance station in which a expert group exists at all times on the public network. Specifically, in order to specify a damaged part, a diagnostic program is loaded from the remote terminal via the public network into an area for the diagnostic program in the file storage unit in the system controller of the relevant system. This diagnostic program is then transmitted to the relevant module via the first communication line so as to replace the control program including an ordinary operation program with the diagnostic program.

In the damaged module in which the diagnostic program has been loaded, diagnostic operations such as individual operations of actuators, confirmation of the operations of necessary sensors, and cooperative operation of plural actuators are performed. Each result of such operations is transmitted to the remote terminal in the remote maintenance station through the following path: first communication line→system controller→public network→remote terminal. A maintenance person, who is always present in the remote maintenance station, specifies the damaged part based on the result data of the operations, and performs transmission of maintenance information for performing suitable maintenance work to a maintenance person at the factory site, similarly via the communication line.

According to such remote maintenance, the following effects can be obtained.

(1) Highly-developed and uniform (for each area) maintenance operations can be performed in a short time by an expert group comprising few members.

(2) A diagnostic program is transmitted at the necessary time from the remote maintenance station; thus, it is unnecessary for each controller itself to contain the diagnostic program, by which storage capacity of the controller can be reduced and a diagnosis by using the newest diagnostic program can be performed. It is therefore possible to construct a high-quality maintenance system.

What is claimed is:

1. An automatic assembly and inspection system for optical connectors, comprising:

a pallet for installing an optical cord;

a transfer mechanism for transferring the pallet;

modules for performing various processes for assembling an optical connector with the optical cord installed on the pallet transferred by the transfer mechanism, said various processes including at least one of the processes of required-length cutting, pre-processing, cleaning, insertion, curing, polishing, polished surface inspection, final assembling, optical performance evaluation, and stamping, and each of the modules having a common combining mechanism and a common communication means with respect to the transfer mechanism; wherein:

the pallet comprises a grip mechanism for gripping a portion of the optical connector, the shape of the gripped portion differing according to the various processes; and the transfer mechanism comprises an installation portion to which each module at any position on a transfer path is fixed by using the combining mechanism of the module and a connecting means for transmitting and receiving signals to and from the fixed module by using the communication means of the module, and a system controller for performing supervised control of the transfer mechanism and the modules using the communication means based on parameters indicating specifications for assembly and inspection of the optical connector.

2. An automatic assembly and inspection system for optical connectors as claimed in claim 1, wherein:

the transfer mechanism has upper and lower paths which move opposite to each other; and the system further comprises an elevating means for transferring the pallet from the upper path to the lower path, or from the lower path to the upper path of the transfer mechanism to transfer the pallet on the transfer mechanism again, and the elevating means has a communication means which is the same as that of each module.

3. An automatic assembly and inspection system for optical connectors as claimed in claim 1, further comprising a removal means for removing the pallet if the pallet is damaged during processing.

4. An automatic assembly and inspection system for optical connectors as claimed in claim 1, wherein the pallet has an area for keeping a slacking and extra part of the optical cord.

5. An automatic assembly and inspection system for optical connectors as claimed in claim 1, wherein the pallet has a heating means for curing adhesive coated on the optical cord.

6. An automatic assembly and inspection system for optical connectors as claimed in claim 1, wherein the pallet has a boot holding mechanism, a coupling holding mechanism, a ferrule holding mechanism with a heater, and a holding mechanism for the optical connector with a boot.

7. An automatic assembly and inspection system for optical connectors as claimed in claim 1, wherein the pallet installs plural optical cords; and plural optical connectors are assembled with the plural optical cords through consecutive manufacturing processes.

8. An automatic assembly and inspection system for optical connectors as claimed in claim 7, further comprising:

an optical cable drum on which an optical cable including the plural optical cords is wound; and an accompaniment mechanism for transferring the optical cable drum according to the transfer of the pallet.

9. An automatic assembly and inspection system for optical connectors as claimed in claim 1, further comprising:

an entry station for storing plural pallets for installing optical cords before assembly and inspection processing;

an exit station for storing the plural pallets after processing;

a supply means for supplying the pallets in turn from the entry station to the transfer mechanism; and an ejection means for ejecting each pallet whose processing has been completed to the exit station.

10. An automatic assembly and inspection system for optical connectors as claimed in claim 1, wherein:

each module consists of a stand, a base plate provided with the combining mechanism, and a main body which is disposed on the stand; and the stand and the base plate are combined via elastic parts.

11. An automatic assembly and inspection system for optical connectors as claimed in claim 1, wherein one or more of the modules has a grip mechanism for grasping a ferrule by using a V-groove-shaped opening and closing mechanism.

12. An automatic assembly and inspection system for optical connectors as claimed in claim 1, wherein the optical connector includes a pre-assembled ferrule as a part of the optical connector, in which a ferrule, a spring, and a stop ring are previously combined using a locating member.

13. An automatic assembly and inspection system for optical connectors as claimed in claim 1, adapted to transmit and receive data between the system controller, the transfer mechanism, and the modules via a serial communication line, and an individual identification number is assigned to each of the transfer mechanism and the modules.

14. An automatic assembly and inspection system for optical connectors as claimed in claim 1, wherein:

the transfer mechanism has general input and output units for communicating with each module; and each of the modules has general output and input units as the communication means, which are respectively connected with the general input and output units.

15. An automatic assembly and inspection system for optical connectors as claimed in claim 14, wherein:

plural pallets for installing optical cords are respectively positioned at each of the modules;

the general output unit of each module outputs an operation completion signal when the operation of the module has been normally completed; and transfer of each pallet to the next module is performed only when all the modules have output the operation completion signals.

16. An automatic assembly and inspection system for optical connectors as claimed in claim 1, wherein:

the modules include a module for inspecting the polished surface of a ferrule and a module for evaluating optical performance of the assembled optical connector; and each of the inspection and evaluation modules has a storage unit for storing inspection data obtained by the module, with lot-number data of the optical cord which are transmitted from the system controller.

17. An automatic assembly and inspection system for optical connectors as claimed in claim 1, wherein the modules include a stamping module for printing a lot number on the optical cord with which the optical connectors have been assembled.

18. An automatic assembly and inspection system for optical connectors as claimed in claim 1, wherein the modules include an insertion module which comprises:

a sensor for detecting a situation in which an optical fiber inside the optical cord protrudes from the top of a ferrule; and a means for caulking a crimp ring to a stop ring only if protrusion of the optical fiber is detected by the sensor when the optical fiber is inserted into a ferrule.

19. An automatic assembly and inspection system for optical connectors as claimed in claim 1, further comprising:

an image-analyzing means for analyzing an image of the end face of the optical connector; and a display means for displaying the analyzed image.

20. An automatic assembly and inspection system for optical connectors as claimed in claim 19, further comprising:

a storage unit for memorizing the analyzed image; and a means for outputting the memorized image from the storage unit so as to produce the image to be displayed on the display means when the status of the end face of the optical connector is examined.

21. An automatic assembly and inspection system for optical connectors as claimed in claim 1, wherein:

the modules include a module having an automatic calculation unit; and the automatic calculation unit and the system controller are connected using a LAN, whereby calculated data are used in common.

22. An automatic assembly and inspection system for optical connectors as claimed in claim 1, further comprising a remote terminal for remotely operating the system controller, and the system controller and the remote terminal being connected via a modem by using a public network.

23. An automatic assembly and inspection system for optical connectors as claimed in claim 1, wherein the system controller has a storage unit for storing a program for controlling each module.

24. An automatic assembly and inspection system for optical connectors as claimed in claim 1, wherein the system controller has a storage unit for storing a program for diagnosing a state of each module.

25. An automatic assembly and inspection system for optical connectors as claimed in claim 1, wherein the system controller has a storage unit for storing information which indicates a state of each module.

26. An automatic assembly and inspection system for optical connectors as claimed in claim 22, wherein:

the system controller has a storage unit for storing a program for controlling each module; and the system controller replaces the program for controlling each module, the program being stored in the storage unit, with a program for diagnosing a state of each module, and the system controller causes the diagnostic program run.

* * * * *